(12) United States Patent
DeHennis et al.

(10) Patent No.: US 12,458,262 B2
(45) Date of Patent: Nov. 4, 2025

(54) DYNAMIC MODIFICATION OF CALIBRATION FREQUENCY

(71) Applicant: Senseonics, Incorporated, Germantown, MD (US)

(72) Inventors: Andrew DeHennis, Germantown, MD (US); Patricia Sanchez, Germantown, MD (US); Samanwoy Ghosh-Dastidar, Germantown, MD (US)

(73) Assignee: Senseonics, Incorporated, Germantown, MD (US)

( * ) Notice: Subject to any disclaimer, the term of this patent is extended or adjusted under 35 U.S.C. 154(b) by 831 days.

(21) Appl. No.: 17/734,295

(22) Filed: May 2, 2022

(65) Prior Publication Data

US 2022/0354391 A1 Nov. 10, 2022

Related U.S. Application Data

(60) Provisional application No. 63/184,354, filed on May 5, 2021.

(51) Int. Cl.
*A61B 5/1495* (2006.01)
*A61B 5/00* (2006.01)

(52) U.S. Cl.
CPC .......... *A61B 5/1495* (2013.01); *A61B 5/0017* (2013.01); *A61B 5/7246* (2013.01); *A61B 2560/0228* (2013.01); *A61B 2560/0238* (2013.01)

(58) Field of Classification Search
CPC ... A61B 5/1495; A61B 5/0017; A61B 5/7246; A61B 5/1451; A61B 5/1473; A61B 5/14532; A61B 2560/0228; A61B 2560/0238

See application file for complete search history.

(56) References Cited

U.S. PATENT DOCUMENTS

| | | |
|---|---|---|
| 8,073,548 B2 | 12/2011 | Colvin, Jr. et al. |
| 2013/0211213 A1 | 8/2013 | DeHennis et al. |
| 2013/0241745 A1 | 9/2013 | Colvin, Jr. et al. |
| 2014/0018644 A1 | 1/2014 | Colvin, Jr. et al. |
| 2014/0128694 A1 | 5/2014 | Gallant et al. |

(Continued)

OTHER PUBLICATIONS https://www.cuemath.com/slope-formula/ (Year: NA) (Year: 2021).*

*Primary Examiner* — Eric F Winakur
*Assistant Examiner* — Hy Khanh Doan
(74) *Attorney, Agent, or Firm* — Rothwell, Figg, Ernst & Manbeck, P.C.

(57) ABSTRACT

Methods, systems, and apparatuses for dynamic modification of calibration frequency. Dynamic modification of calibration frequency may include one or more of: receiving sensor data conveyed by an analyte sensor comprising an analyte indicator, using the sensor data to calculate one or more analyte levels, and receiving one or more reference analyte level measurements. Dynamic modification of calibration frequency may include using the sensor data, the one or more calculated analyte levels, and/or the one or more reference analyte level measurements to calculate a degradation rate of the analyte indicator of the analyte sensor. Dynamic modification of calibration frequency may include setting a dynamic calibration frequency based on the calculated degradation rate.

27 Claims, 12 Drawing Sheets

(56) References Cited

U.S. PATENT DOCUMENTS

2015/0278976 A1* 10/2015 Sankaran .......... G06Q 10/0633
                                                      705/3
2017/0273606 A1   9/2017 Estes et al.
2018/0303387 A1  10/2018 DeHennis et al.

* cited by examiner

DYNAMIC MODIFICATION OF CALIBRATION FREQUENCY

CROSS-REFERENCE TO RELATED APPLICATION

The present application claims the benefit of priority to U.S. Provisional Application Ser. No. 63/184,354, filed on May 5, 2021, which is incorporated herein by reference in its entirety.

BACKGROUND

Field of Invention

Aspects of the present invention relate to systems and methods for analyte monitoring. Specifically, aspects of the present invention may relate to dynamic calibration frequency (e.g., based on a degradation rate of an analyte indicator).

Discussion of the Background

The prevalence of diabetes mellitus continues to increase in industrialized countries, and projections suggest that this figure will rise to 4.4% of the global population (366 million individuals) by the year 2030. Glycemic control is a key determinant of long-term outcomes in patients with diabetes, and poor glycemic control is associated with retinopathy, nephropathy and an increased risk of myocardial infarction, cerebrovascular accident, and peripheral vascular disease requiring limb amputation. Despite the development of new insulins and other classes of antidiabetic therapy, roughly half of all patients with diabetes do not achieve recommended target hemoglobin A1c (HbA1c) levels<7.0%.

Frequent self-monitoring of blood glucose (SMBG) is necessary to achieve tight glycemic control in patients with diabetes mellitus, particularly for those requiring insulin therapy. However, current blood (finger-stick) glucose tests are burdensome, and, even in structured clinical studies, patient adherence to the recommended frequency of SMBG decreases substantially over time. Moreover, finger-stick measurements only provide information about a single point in time and do not yield information regarding intraday fluctuations in blood glucose levels that may more closely correlate with some clinical outcomes.

Continuous glucose monitors (CGMs) have been developed in an effort to overcome the limitations of finger-stick SMBG and thereby help improve patient outcomes. These systems enable increased frequency of glucose measurements and a better characterization of dynamic glucose fluctuations, including episodes of unrealized hypoglycemia. Furthermore, integration of CGMs with automated insulin pumps allows for establishment of a closed-loop "artificial pancreas" system to more closely approximate physiologic insulin delivery and to improve adherence.

SUMMARY

Monitoring real-time analyte levels from a living body via wireless analyte monitoring sensor(s) may provide numerous health and research benefits. There is a need to enhance such analyte monitoring systems via innovations comprising, but not limited to, dynamically modifying calibration frequency, which may provide the advantage of a reduced calibration frequency when conditions allow.

In some aspects, an analyte monitoring system may have a calibration frequency that changes based on a rate of change of degradation of an analyte indicator of an analyte sensor. In some aspects, when the analyte indicator is detected to be degrading at a high rate, the calibration frequency may be increased from a first calibration frequency (e.g., one calibration per day) to a second calibration frequency (e.g., two calibrations per day). In some aspects, when the analyte indicator is detected to be degrading at a low rate, the calibration frequency may be decreased from the second calibration frequency to the first calibration frequency.

One aspect of the invention may provide a method including receiving sensor data conveyed by an analyte sensor comprising an analyte indicator. The method may include using the sensor data to calculate one or more analyte levels. The method may include receiving one or more reference analyte level measurements. The method may include using the sensor data, the one or more calculated analyte levels, and/or the one or more reference analyte level measurements to calculate a degradation rate of the analyte indicator of the analyte sensor. The method may include setting a dynamic calibration frequency based on the calculated degradation rate.

In some aspects, calculating the degradation rate may include calculating a first sensitivity of the analyte indicator of the analyte sensor to changes in an amount or concentration of an analyte in proximity to the analyte indicator at a first time. In some aspects, calculating the degradation rate may include calculating a second sensitivity of the analyte indicator of the analyte sensor to changes in an amount or concentration of the analyte in proximity to the analyte indicator at a second time. In some aspects, calculating the degradation rate may include using the calculated first and second sensitivities to calculate a sensitivity rate of change. In some aspects, the calculated degradation rate may be equal to the calculated sensitivity rate of change. In some aspects, the calculated degradation rate may be equal to an absolute value of the calculated sensitivity rate of change.

In some aspects, using the calculated first and second sensitivities to calculate the sensitivity rate of change may include dividing a difference between the calculated first and second sensitivities by a difference between the first and second times. In some aspects, using the calculated first and second sensitivities to calculate the sensitivity rate of change may include constructing a sensitivity curve that fits sensitivity data points including at least the calculated first and second sensitivities at the first and second times, respectively. In some aspects, using the calculated first and second sensitivities to calculate the sensitivity rate of change may include calculating a first derivative of the sensitivity curve at the first time. In some aspects, using the calculated first and second sensitivities to calculate the sensitivity rate of change may include calculating a second derivative of the sensitivity curve at the first time.

In some aspects, calculating the first and second sensitivities may include pairing the one or more reference analyte level measurements with one or more analyte levels calculated using the sensor data. In some aspects, calculating the first and second sensitivities may include calculating a ratio of a standard deviation of a sensor measurement of the received sensor data to a standard deviation of the sensor measurements at initial testing.

In some aspects, the analyte indicator may include analyte indicator molecules and degradation indicator molecules, and calculating the degradation rate may include calculating a first degradation of the analyte indicator molecules of the analyte indicator at a first time using one or more degradation measurements indicative of a degradation of the degradation indicator molecules of the analyte indicator at the first time. In some aspects, calculating the degradation rate may include calculating a second degradation of the analyte indicator molecules at a second time using one or more degradation measurements indicative of a degradation of the degradation indicator molecules at the second time. In some aspects, calculating the degradation rate may include using the calculated first and second degradations of the analyte indicator to calculate the degradation rate.

In some aspects, using the calculated first and second degradations to calculate the degradation rate may include dividing a difference between the calculated first and second degradations by a difference between the first and second times. In some aspects, using the calculated first and second degradations to calculate the degradation rate may include constructing a degradation curve that fits degradation data points including at least the calculated first and second degradations at the first and second times, respectively. In some aspects, using the calculated first and second degradations to calculate the degradation rate may include calculating a first derivative of the degradation curve at the first time. In some aspects, using the calculated first and second degradations to calculate the degradation rate may include calculating a second derivative of the degradation curve at the first time.

In some aspects, the sensor data may include the one or more degradation measurements indicative of the degradation of the degradation indicator molecules at the second time. In some aspects, the one or more degradation measurements indicative of the degradation of the degradation indicator molecules at the second time may include a measurement indicative of an amount of emission light emitted by the degradation indicator molecules and/or a measurement indicative of an amount of excitation light emitted to the degradation indicator molecules and reflected by the degradation indicator molecules.

In some aspects, setting the dynamic calibration frequency based on the calculated degradation rate may include: determining whether the calculated degradation rate is below a first degradation rate threshold; and setting the dynamic calibration frequency based on whether the calculated degradation rate is determined to be below the first degradation rate threshold. In some aspects, setting the dynamic calibration frequency based on the calculated degradation rate may include setting the dynamic calibration frequency at a first calibration frequency if the calculated degradation rate is determined to be below the first degradation rate threshold.

In some aspects, setting the dynamic calibration frequency based on the calculated degradation rate may further include: determining whether the calculated degradation rate is below a second degradation rate threshold; and setting the dynamic calibration frequency based on whether the calculated degradation rate is determined to be below the second degradation rate threshold. In some aspects, setting the dynamic calibration frequency based on the calculated degradation rate may include setting dynamic calibration frequency at a second calibration frequency if the calculated degradation rate is determined to be below the second degradation rate threshold and not below the first degradation rate threshold. In some aspects, the second calibration frequency may be higher than a first calibration frequency at which the dynamic calibration frequency is set if the calculated degradation rate is determined to be below the first degradation rate threshold. In some aspects, setting the dynamic calibration frequency based on the calculated degradation rate may include setting the dynamic calibration frequency at a third calibration frequency if the calculated degradation rate is determined to be not below the second degradation rate threshold.

In some aspects, setting the dynamic calibration frequency based on the calculated degradation rate may include setting the dynamic calibration frequency at one of $n+1$ calibration frequencies based on whether the calculated degradation rate is below one or more of n degradation rate thresholds, and n may be an integer greater than or equal to 1.

In some aspects, setting the dynamic calibration frequency based on the calculated degradation rate may include calculating a calibration frequency based on the calculated degradation rate. In some aspects, setting the dynamic calibration frequency based on the calculated degradation rate may include calculating a calibration frequency based on the calculated degradation rate and one or more previously calculated degradation rates. In some aspects, setting the dynamic calibration frequency based on the calculated degradation rate may include determining whether the calculated degradation rate is below an initialization degradation rate threshold and calculating the calibration frequency if the calculated degradation rate is determined to be below the initialization degradation rate threshold. In some aspects, setting the dynamic calibration frequency based on the calculated degradation rate may include setting the dynamic calibration frequency at an initialization calibration frequency if the calculated degradation rate is determined to be not below the initialization degradation rate threshold.

In some aspects, the method may further include determining whether a time since implant of the analyte sensor exceeds a time threshold, and the degradation rate is determined and the dynamic calibration frequency may be set in response to the time since implant being determined to exceed the time threshold. In some aspects, the method may further include maintaining the dynamic calibration frequency if the time since implant is determined to not exceed the time threshold.

In some aspects, the method may further include prompting a user of the analyte sensor to enter a reference analyte level measurement at the dynamic calibration frequency. In some aspects, prompting the user of the analyte sensor to enter the reference analyte level measurement may include using a user interface of a display device to prompt the user to enter the reference analyte level measurement.

In some aspects, the method may further include providing an indication of the dynamic calibration frequency to a user of the analyte sensor. In some aspects, providing the indication may include using a user interface of a display device to provide the indication to the user.

In some aspects, the method may further include using the one or more reference analyte level measurements to calibrate the analyte sensor. In some aspects, the method may further include determining whether the one or more reference analyte level measurements meet acceptance criteria, and calibrating the analyte sensor using the one or more reference analyte level measurements if the one or more reference analyte level measurements are determined to meet the acceptance criteria.

In some aspects, the method may further include prompting a user of the analyte sensor to enter one or more reference analyte level measurements if the one or received reference analyte level measurements are determined to not meet the acceptance criteria. In some aspects, the one or more reference analyte level measurements may be one or more self-monitoring blood glucose (SMBG) measurements obtained from one or more finger-stick blood samples.

Another aspect of the invention may provide a transceiver adapted to receive sensor data conveyed by an analyte sensor comprising an analyte indicator. The transceiver may be adapted to use the sensor data to calculate one or more analyte levels. The transceiver may be adapted to receive one or more reference analyte level measurements. The transceiver may be adapted to use the sensor data, the one or more calculated analyte levels, and/or the one or more reference analyte level measurements to calculate a degradation rate of the analyte indicator of the analyte sensor. The transceiver may be adapted to set a dynamic calibration frequency based on the calculated degradation rate.

Yet another aspect of the invention may provide a display device adapted to receive sensor data conveyed by an analyte sensor comprising an analyte indicator. The display device may be adapted to use the sensor data to calculate one or more analyte levels. The display device may be adapted to receive one or more reference analyte level measurements. The display device may be adapted to use the sensor data, the one or more calculated analyte levels, and/or the one or more reference analyte level measurements to calculate a degradation rate of the analyte indicator of the analyte sensor. The display device may be adapted to set a dynamic calibration frequency based on the calculated degradation rate.

Still another aspect of the invention may provide a system comprising a transceiver and a display device. The system may be adapted to receive sensor data conveyed by an analyte sensor comprising an analyte indicator. The system may be adapted to use the sensor data to calculate one or more analyte levels. The system may be adapted to receive one or more reference analyte level measurements. The system may be adapted to use the sensor data, the one or more calculated analyte levels, and/or the one or more reference analyte level measurements to calculate a degradation rate of the analyte indicator of the analyte sensor. The system may be adapted to set a dynamic calibration frequency based on the calculated degradation rate.

Further variations encompassed within the systems and methods are described in the detailed description of the invention below.

BRIEF DESCRIPTION OF THE DRAWINGS

The accompanying drawings, which are incorporated herein and form part of the specification, illustrate various, non-limiting aspects of the present invention. In the drawings, like reference numbers indicate identical or functionally similar elements.

DETAILED DESCRIPTION OF PREFERRED EMBODIMENTS

Figure 1:
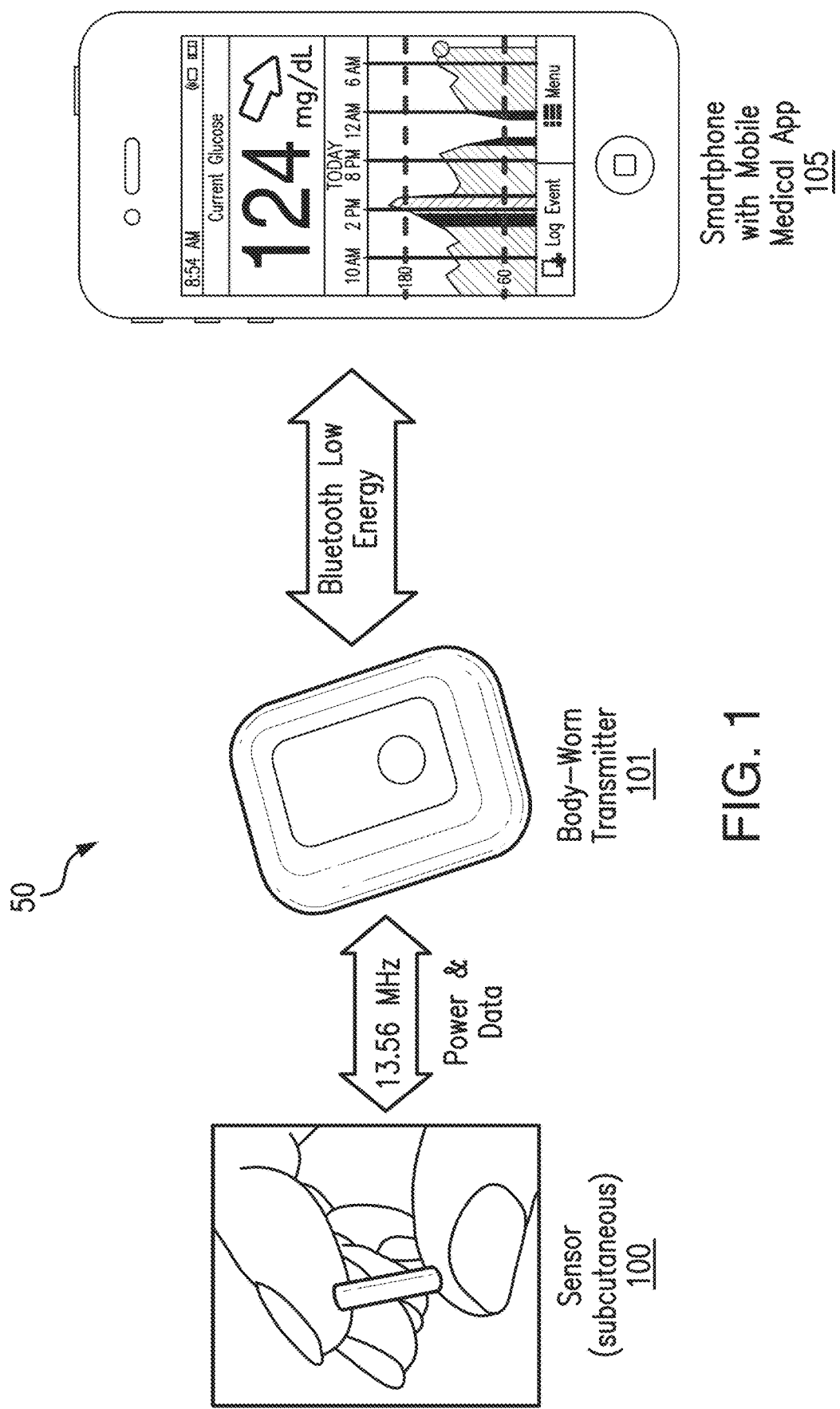
FIG. 1 is a schematic view illustrating an analyte monitoring system embodying aspects of the present invention.

FIG. 1 is a schematic view of an exemplary analyte monitoring system 50 embodying aspects of the present invention. The analyte monitoring system 50 may be a continuous analyte monitoring system (e.g., a continuous glucose monitoring system). In some aspects, the analyte monitoring system 50 may include one or more of an analyte sensor 100, a transceiver 101, and a display device 105. In some aspects, the analyte monitoring system 50 may additionally include a data management system (DMS) (not shown). In some aspects, the DMS may be a web-based DMS (e.g., hosted on a remote server). In some aspects, the DMS may provide cloud storage for the analyte monitoring information of the system 50.

In some aspects, the sensor 100 may be small, fully subcutaneously implantable sensor. However, this is not required, and, in some alternative aspects, the sensor 100 may be a partially implantable (e.g., transcutaneous) sensor or a fully external sensor. In some aspects, the transceiver 101 may be an externally worn transceiver (e.g., attached via an armband, wristband, waistband, or adhesive patch). In some aspects, the transceiver 101 may communicate with the sensor 100 to initiate one or more sensor measurements and receive sensor data via a wireless connection (e.g., via near field communication (NFC)) or a wired connection. In some aspects, the sensor data may include one or more sensor measurements including one or more light measurements and/or one or more temperature measurements. In some aspects, the one or more sensor measurements may be indicative of an amount or concentration of an analyte in a medium (e.g., interstitial fluid) of a living animal (e.g., a living human).

In some aspects, the transceiver 101 may calculate one or more analyte level (e.g., analyte concentrations) using at least the received sensor measurements. In some aspects, the transceiver 101 may communicate information (e.g., one or more analyte levels) wirelessly (e.g., via a Bluetooth™ communication standard such as, for example and without limitation Bluetooth Low Energy) to a mobile medical application (MMA) running on a display device 105 (e.g., a smartphone or tablet). In some aspects, the MMA may additionally or alternatively receive the information receive the information from the transceiver 101 through a wired connection (e.g., using a Universal Serial Bus (USB)) port. In some aspects, the MMA may communicate with the data management system (e.g., for plotting and sharing of the received information).

Figure 2A:
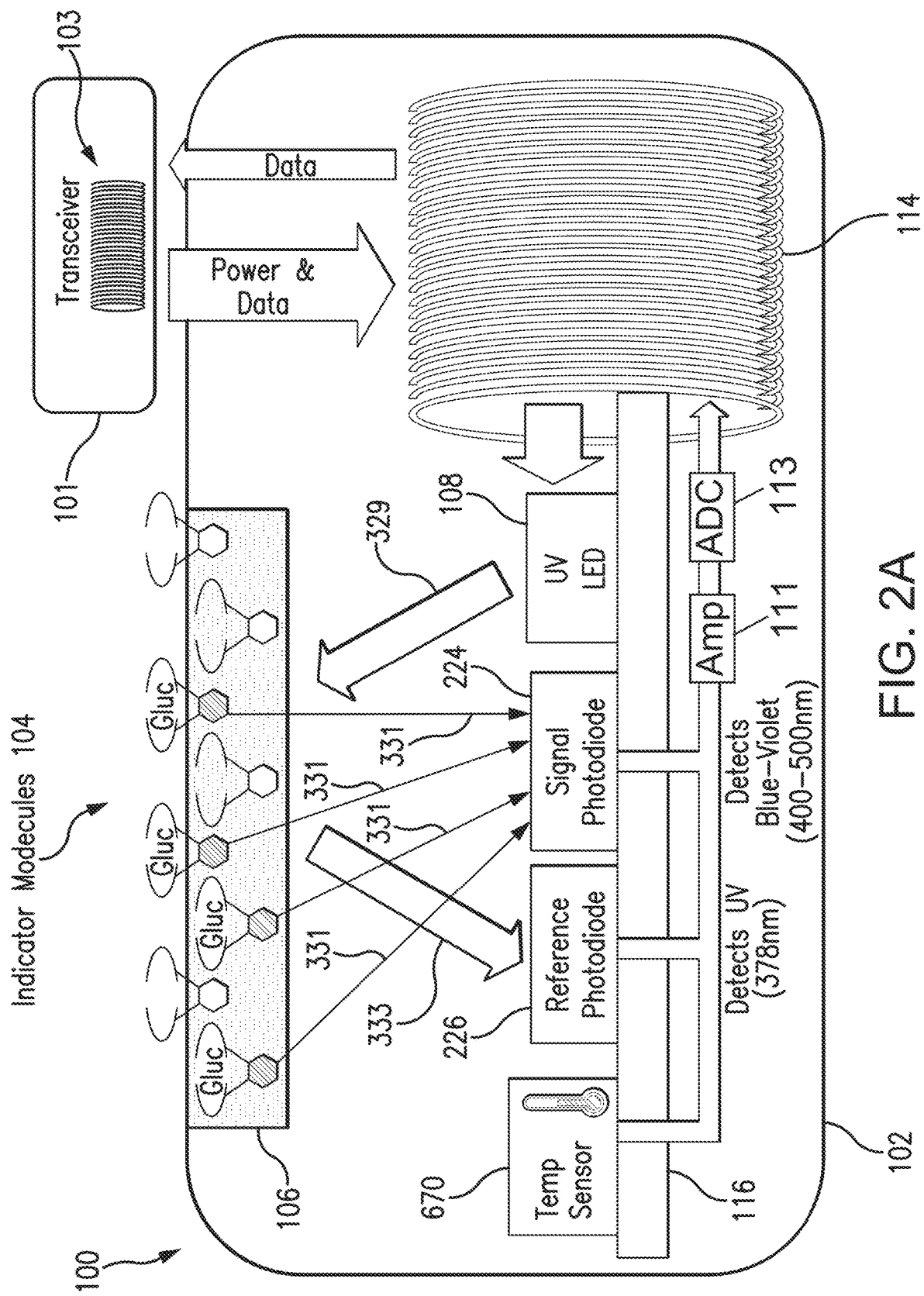
FIG. 2A is a schematic view illustrating a sensor and transceiver of an analyte monitoring system embodying aspects of the present invention.

In some aspects, as illustrated in FIG. 2A, the transceiver 101 may include an inductor 103, such as, for example, a coil. The transceiver 101 may generate an electromagnetic wave or electrodynamic field (e.g., by using a coil) to induce a current in an inductor 114 of the sensor 100, which powers the sensor 100. The transceiver 101 may also convey data (e.g., commands) to the sensor 100. For example, in some aspects, the transceiver 101 may convey data by modulating the electromagnetic wave used to power the sensor 100 (e.g., by modulating the current flowing through a coil 103 of the transceiver 101). The modulation in the electromagnetic wave generated by the transceiver 101 may be detected/ extracted by the sensor 100. Moreover, the transceiver 101 may receive data (e.g., measurement information) from the sensor 100. For example, in some aspects, the transceiver 101 may receive data by detecting modulations in the electromagnetic wave generated by the sensor 100, e.g., by detecting modulations in the current flowing through the coil 103 of the transceiver 101.

The inductor 103 of the transceiver 101 and the inductor 114 of the sensor 100 may be in any configuration that permits adequate field strength to be achieved when the two inductors are brought within adequate physical proximity.

In some aspects, as illustrated in FIG. 2A, the sensor 100 may be encased in a sensor housing 102 (i.e., body, shell, capsule, or encasement), which may be rigid and biocompatible. In some aspects, the sensor housing 102 may be a silicon tube. However, this is not required, and, in other aspects, different materials and/or shapes may be used for the sensor housing 102. In some aspects, the analyte sensor 100 may include a transmissive optical cavity. In some aspects, the transmissive optical cavity may be formed from a suitable, optically transmissive polymer material, such as, for example, acrylic polymers (e.g., polymethylmethacrylate (PMMA)). However, this is not required, and, in other aspects, different materials may be used for the transmissive optical cavity.

In some aspects, the sensor 100 may include an analyte indicator 106, such as, for example, a polymer graft or hydrogel coated, diffused, adhered, embedded, or grown on or in at least a portion of the exterior surface of the sensor housing 102. In some non-limiting aspects, the sensor housing 102 may include one or more cutouts or recesses, and the indicator elements 106 may be located (partially or entirely) in the cutouts or recesses. In some aspects, the indicator element 106 may be porous and may allow the analyte (e.g., glucose) in a medium (e.g., interstitial fluid) to diffuse into the indicator element 106.

In some aspects, the analyte indicator 106 (e.g., polymer graft or hydrogel) of the sensor 100 may include analyte indicator molecules 104 (e.g., fluorescent indicator molecules) exhibiting one or more detectable properties (e.g., optical properties) based on the amount or concentration of the analyte in proximity to the analyte indicator 106. In some aspects, the sensor 100 may include one or more light sources 108 that emit excitation light 329 over a range of wavelengths that interact with the indicator molecules 104. The sensor 100 may also include one or more photodetectors 224, 226 (e.g., photodiodes, phototransistors, photoresistors, or other photosensitive elements). The one or more photodetectors (e.g., photodetector 224) may be sensitive to emission light 331 (e.g., fluorescent light) emitted by the indicator molecules 104 such that a signal generated by a photodetector (e.g., photodetector 224) in response thereto that is indicative of the level of emission light 331 of the indicator molecules and, thus, the amount of analyte of interest (e.g., glucose, oxygen, cardiac markers, low-density lipoprotein (LDL), high-density lipoprotein (HDL), or triglycerides). In some aspects, one or more of the photodetectors (e.g., photodetector 226) may be sensitive to excitation light 329 that is reflected from the analyte indicator 106 as reflection light 333. In some aspects, one or more of the photodetectors may be covered by one or more filters that allow only a certain subset of wavelengths of light to pass through (e.g., a subset of wavelengths corresponding to emission light 331 or a subset of wavelengths corresponding to reflection light 333) and reflect the remaining wavelengths. In some aspects, the sensor 100 may include a temperature transducer 670. In some aspects, the sensor 100 may include a drug-eluting polymer matrix that disperses one or more therapeutic agents (e.g., an anti-inflammatory drug).

In some aspects, the outputs of one or more of the photodetectors 224, 226 and the temperature transducer 670 may be amplified by an amplifier 111. In some aspects, the amplifier 111 may be a comparator that receives analog light measurement signals from the photodetectors 224, 226 and output an analog light difference measurement signal indicative of the difference between the received analog light measurement signals. In some aspects, the amplifier 111 may be a transimpedance amplifier. However, in some alternative aspects, a different amplifier may be used. In some aspects, the outputs of one or more of the photodetectors 224, 226, the temperature transducer 670, and the amplifier 111 may be converted to a digital signal by an analog-to-digital converter (ADC) 113.

In some aspects, as illustrated in FIG. 2A, the sensor 100 may include a substrate 116. In some aspects, the substrate 116 may be a circuit board (e.g., a printed circuit board (PCB) or flexible PCB) on which circuit components (e.g., analog and/or digital circuit components) may be mounted or otherwise attached. However, in some alternative aspects, the substrate 116 may be a semiconductor substrate having circuitry fabricated therein. The circuitry may include analog and/or digital circuitry. Also, in some semiconductor substrate aspects, in addition to the circuitry fabricated in the semiconductor substrate, circuitry may be mounted or otherwise attached to the semiconductor substrate 116. In other words, in some semiconductor substrate aspects, a portion or all of the circuitry, which may include discrete circuit elements, an integrated circuit (e.g., an application specific integrated circuit (ASIC)) and/or other electronic components (e.g., a non-volatile memory), may be fabricated in the semiconductor substrate 116 with the remainder of the circuitry is secured to the semiconductor substrate 116 and/or a core (e.g., ferrite core) for the inductor 114. In some aspects, the semiconductor substrate 116 and/or a core may provide communication paths between the various secured components.

In some aspects, the one or more of the sensor housing 102, analyte indicator 106, indicator molecules 104, light source 108, photodetectors 224, 226, temperature transducer 670, substrate 116, and inductor 114 of sensor 100 may include some or all of the features described in one or more of U.S. application Ser. No. 13/761,839, filed on Feb. 7, 2013, U.S. application Ser. No. 13/937,871, filed on Jul. 9, 2013, and U.S. application Ser. No. 13/650,016, filed on Oct. 11, 2012, all of which are incorporated by reference in their entireties. Similarly, the structure and/or function of the sensor 100 and/or transceiver 101 may be as described in one or more of U.S. application Ser. Nos. 13/761,839, 13/937,871, and 13/650,016.

Although in some aspects, as illustrated in FIG. 2A, the sensor 100 may be an optical sensor, this is not required, and, in one or more alternative aspects, sensor 100 may be a different type of analyte sensor, such as, for example, an electrochemical sensor, a diffusion sensor, or a pressure sensor. Also, although in some aspects, as illustrated in FIGS. 1 and 2A, the analyte sensor 100 may be a fully implantable sensor, this is not required, and, in some alternative aspects, the sensor 100 may be a transcutaneous sensor having a wired connection to the transceiver 101. For example, in some alternative aspects, the sensor 100 may be located in or on a transcutaneous needle (e.g., at the tip thereof). In these aspects, instead of wirelessly communicating using inductors 103 and 114, the sensor 100 and transceiver 101 may communicate using one or more wires connected between the transceiver 101 and the transceiver transcutaneous needle that includes the sensor 100. For another example, in some alternative aspects, the sensor 100 may be located in a catheter (e.g., for intravenous blood glucose monitoring) and may communicate (wirelessly or using wires) with the transceiver 101.

In some aspects, the sensor 100 may include a transceiver interface device. In some aspects where the sensor 100 includes an antenna (e.g., inductor 114), the transceiver interface device may include the antenna (e.g., inductor 114) of sensor 100. In some of the transcutaneous aspects where there exists a wired connection between the sensor 100 and the transceiver 101, the transceiver interface device may include the wired connection.

Figure 2B:
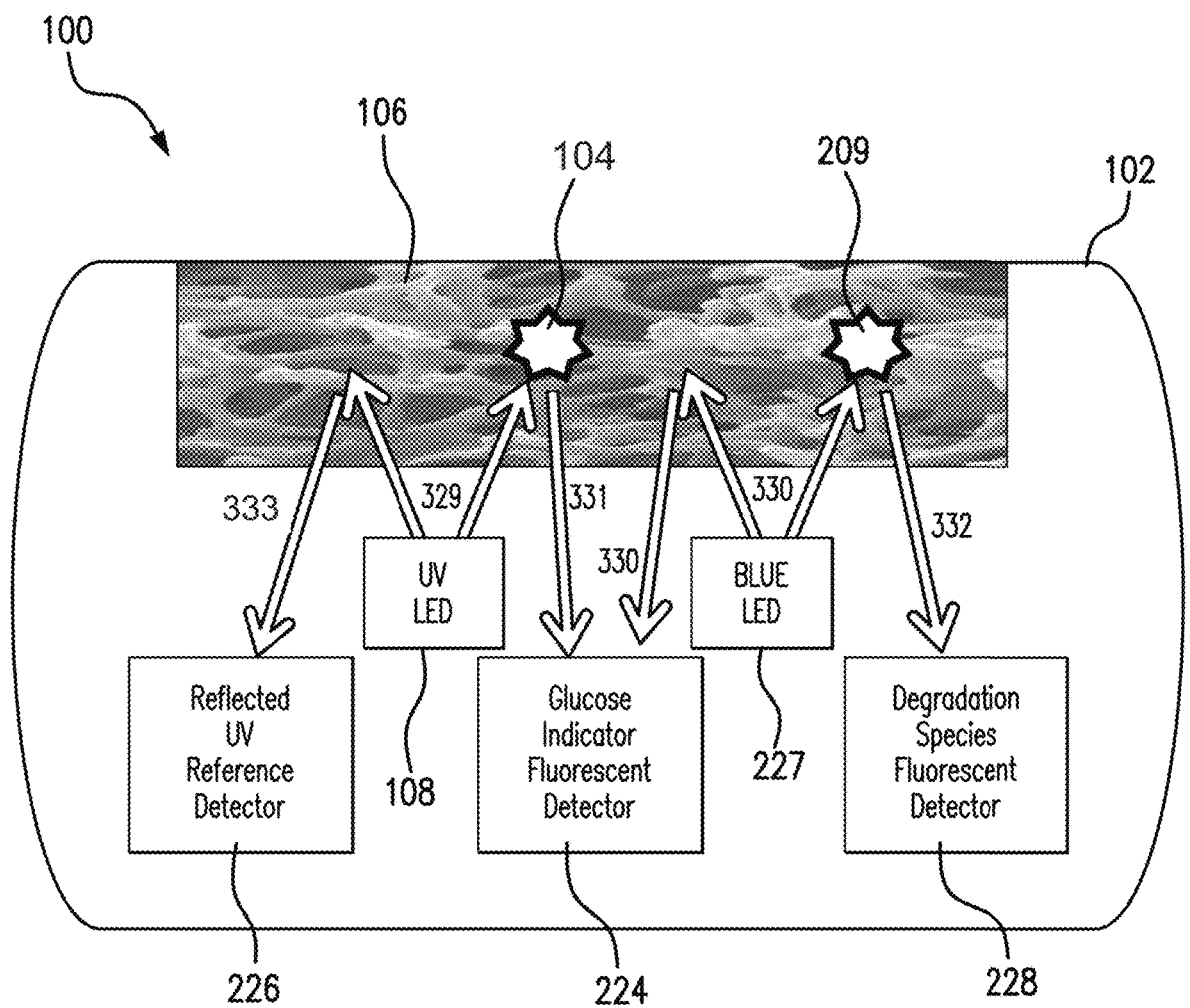
FIG. 2B is a schematic view illustrating an analyte sensor embodying aspects of the present invention.

In some aspects, as shown in FIG. 2B, the analyte indicator 106 (e.g., polymer graft or hydrogel) of the analyte sensor 100 may include the analyte indicator molecules 104 and degradation indicator molecules 209. In some aspects, the analyte indicator molecules 104 may exhibit one or more detectable properties (e.g., optical properties) that vary in accordance with (i) the amount or concentration of the analyte in proximity to the analyte indicator 106 and (ii) changes to the analyte indicator molecules 104. In some aspects, the changes to the analyte indicator molecules 104 may comprise the extent to which the analyte indicator molecules 104 have degraded. In some aspects, the degradation may be (at least in part) ROS-induced oxidation. In some non-limiting aspects, the analyte indicator molecules 104 may be phenylboronic-based analyte indicator molecules. However, phenylboronic-based analyte indicator molecules are not required, and, in some alternative aspects, the analyte sensor 100 may include different analyte indicator molecules, such as, for example and without limitation, glucose oxidase-based indicators, glucose dehydrogenase-based indicators, and glucose binding protein-based indicators.

In some aspects, the degradation indicator molecules 209 may exhibit one or more detectable properties (e.g., optical properties) that vary in accordance with changes to the degradation indicator molecules 209. In some aspects, the degradation indicator molecules 209 is not sensitive to the amount of concentration of the analyte in proximity to the analyte indicator 106. That is, in some aspects, the one or more detectable properties exhibited by the degradation indicator molecules 209 do not vary in accordance with the amount or concentration of the analyte in proximity to the analyte indicator 106. However, this is not required, and, in some alternative aspects, the one or more detectable properties exhibited by the degradation indicator molecules 209 may vary in accordance with the amount or concentration of the analyte in proximity to the analyte indicator 106.

In some aspects, the changes to the degradation indicator molecules 209 may comprise the extent to which the degradation indicator molecules 209 has degraded. In some aspects, the degradation may be (at least in part) ROS-induced oxidation. In some aspects, the degradation indicator molecules 209 (e.g., fluorescent degradation indicator molecules) may be distributed throughout the analyte indicator 106. In some non-limiting aspects, the degradation indicator molecules 209 may be a phenylboronic-based degradation indicator. However, a phenylboronic-based degradation indicator is not required, and, in some alternative aspects, the analyte sensor 100 may include a different degradation indicator molecules, such as, for example and without limitation, amplex red-based degradation indicators, dichlorodihydrofluorescein-based indicators, dihydrorhodamine-based indicators, and scopoletin-based degradation indicators.

In some aspects, the analyte sensor 100 may measure changes to the analyte indicator molecules 104 indirectly using the degradation indicator molecules 209, which may by sensitive to degradation by reactive oxygen species (ROS) but not sensitive to the analyte. In some aspects, the degradation indicator molecules 209 may have one or more optical properties that change with extent of oxidation and may be used as a reference dye for measuring and correcting for extent of oxidation of the analyte indicator molecules 104. In some aspects, the extent to which the degradation indicator molecules 209 have degraded may correspond to the extent to which the analyte indicator molecules 104 have degraded. For example, in some non-limiting aspects, the extent to which the degradation indicator molecules 209 have degraded may be proportional to the extent to which the analyte indicator molecules 104 have degraded. In some non-limiting aspects, the extent to which the analyte indicator molecules 104 have degraded may be calculated based on the extent to which the degradation indicator molecules 209 have degraded.

In some aspects, as shown in FIG. 2B, the one or more lights sources 108 may be one or more first light sources 108, and the excitation light 329 emitted by the one or more first light sources 108 may be first excitation light 329. In some aspects, the one or more first light sources 108 may emit the first excitation light 329 over a range of wavelengths that interact with the analyte indicator molecules 104 in the analyte indicator 106. In some aspects, the first excitation light 329 may be ultraviolet (UV) light. In some aspects, the analyte sensor 100 may include one or more light sources 227 that emit second excitation light 330 over a range of wavelengths that interact with the degradation indicator molecules 209 in the analyte indicator 106. In some aspects, the second excitation light 330 may be blue light.

In some aspects, as shown in FIG. 2B, the analyte sensor 100 may include one or more photodetectors 224, 226, 228 (e.g., photodiodes, phototransistors, photoresistors, or other photosensitive elements). In some aspects, the analyte sensor 100 may include one or more signal photodetectors 224 sensitive to first emission light 331 (e.g., fluorescent light) emitted by the analyte indicator molecules 104 of the analyte indicator 106 such that a signal generated by a photodetector 224 in response thereto that is indicative of the level of first emission light 331 of the analyte indicator molecules 104 and, thus, the amount of analyte of interest (e.g., glucose). In some aspects, the analyte sensor 100 may include one or more reference photodetectors 226 may be sensitive to first excitation light 329 that may be reflected from the analyte indicator 106 as reflection light 333. In some aspects, the analyte sensor 100 may include one or more degradation photodetectors 228 sensitive to second emission light 332 (e.g., fluorescent light) emitted by the degradation indicator molecules 209 of the analyte indicator 106 such that a signal generated by a photodetector 228 in response thereto is indicative of the level of second emission light 332 of the degradation indicator molecules 209 and, thus, the amount of degradation (e.g., oxidation). In some aspects, the one or more signal photodetectors 224 may be sensitive to second excitation light 330 that may be reflected from the analyte indicator 106. In this way, the one or more signal photodetectors 224 may act as reference photodetectors when the one or more light sources 227 are emitting second excitation light 330. However, this is not required, and, in some alternative aspects, a different photodetector (or photodetectors) may be used to detect the second excitation light 330 that may be reflected from the analyte indicator 106 (e.g., by the degradation indicator molecules 209).

In some aspects, the first excitation light 329 may be over a first wavelength range, and the second excitation light 330 over a second wavelength range, which may different than the first wavelength range. In some aspects, the first and second wavelength ranges do not overlap, but this not required, and, in some alternative aspects, the first and second wavelength ranges may overlap. In some aspects, the first emission light 331 may be over a third wavelength range, and the second emission light 332 may be over a fourth wavelength range, which may be different than the third wavelength range. In some aspects, the third and fourth wavelength ranges do not overlap, but this is not required, and, in some alternative aspects, the third and fourth wavelength ranges may overlap. In some aspects, the first and third wavelength ranges may be different. In some aspects, the first and third wavelength ranges do not overlap, but this is not required, and, in some alternative aspects, the first and third wavelength ranges may overlap. In some aspects, the second and fourth wavelength ranges may be different. In some aspects, the second and fourth wavelength ranges do not overlap, but this is not required, and, in some alternative aspects, the second and fourth wavelength ranges may overlap. In some aspects, the second and third wavelength ranges may overlap.

In some aspects, one or more of the photodetectors 224, 226, 228 may be covered by one or more filters that allow only a certain subset of wavelengths of light to pass through and reflect (or absorb) the remaining wavelengths. In some aspects, one or more filters on the one or more signal photodetectors 224 may allow only a subset of wavelengths corresponding to first emission light 331 and/or the reflected second excitation light 330. In some aspects, one or more filters on the one or more reference photodetectors 226 may allow only a subset of wavelengths corresponding to the reflected first excitation light 329. In some aspects, one or more filters on the one or more degradation photodetectors 228 may allow only a subset of wavelengths corresponding to second emission light 332.

Figure 3:
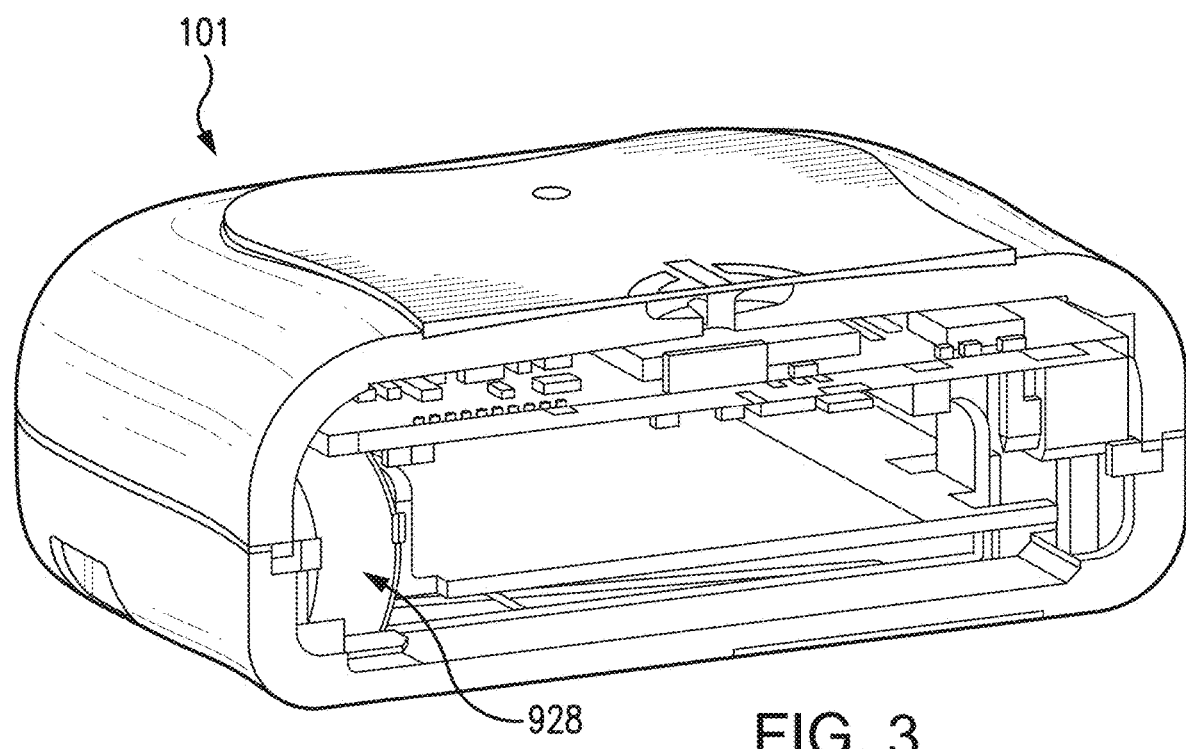
FIG. 3 is cross-sectional, perspective view of a transceiver embodying aspects of the invention.
Figure 4:
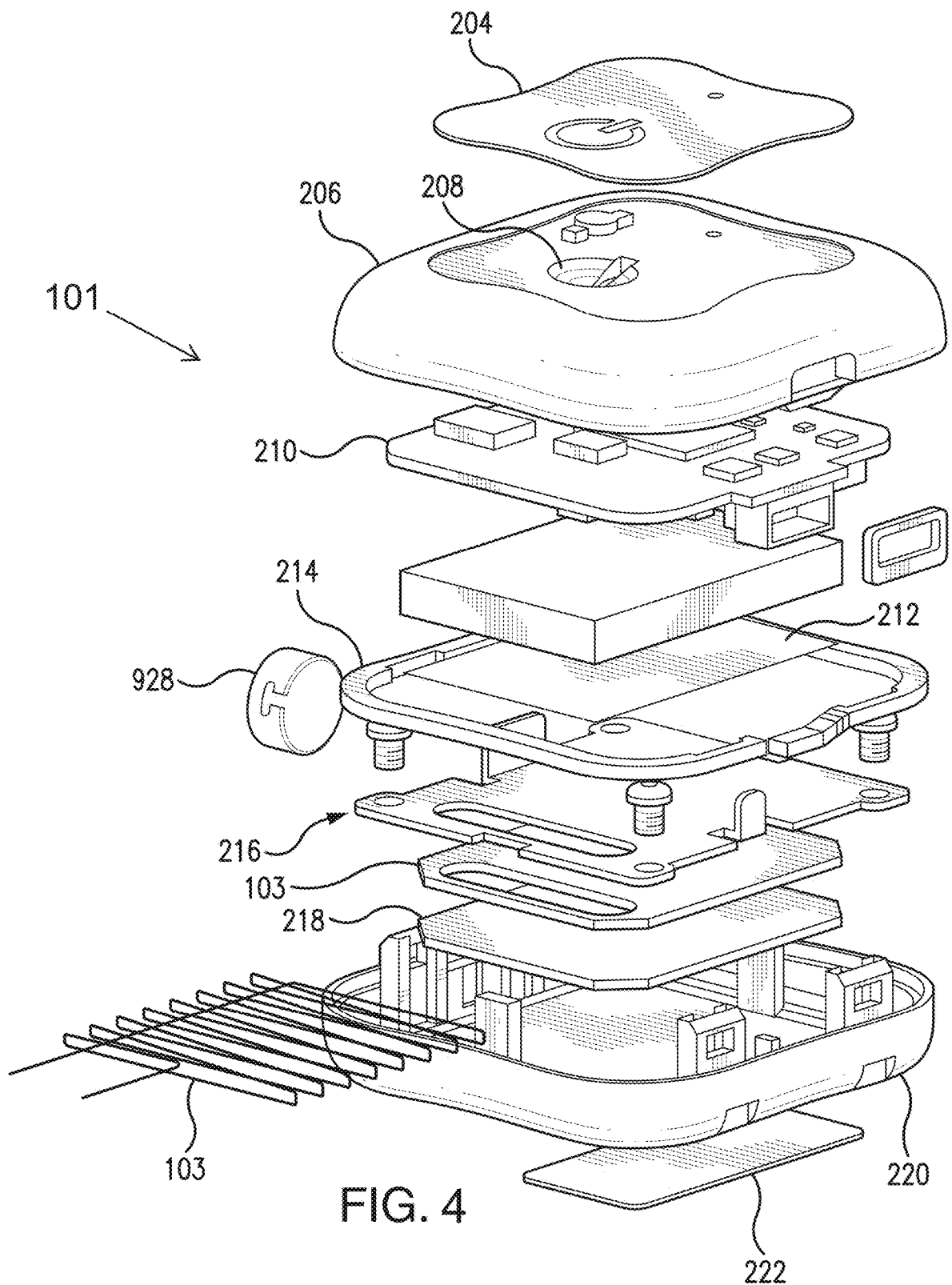
FIG. 4 is an exploded, perspective view of a transceiver embodying aspects of the invention.

FIGS. 3 and 4 are cross-sectional and exploded views, respectively, of a non-limiting embodiment of the transceiver 101, which may be included in the analyte monitoring system illustrated in FIG. 1. As illustrated in FIG. 4, in some aspects, the transceiver 101 may include a graphic overlay 204, front housing 206, button 208, printed circuit board (PCB) assembly 210, battery 212, gaskets 214, antenna 103, frame 218, reflection plate 216, back housing 220, ID label 222, and/or vibration motor 928. In some aspects, the vibration motor 928 may be attached to the front housing 206 or back housing 220 such that the battery 212 does not dampen the vibration of vibration motor 928. In some aspects, the transceiver electronics may be assembled using standard surface mount device (SMD) reflow and solder techniques. In one embodiment, the electronics and peripherals may be put into a snap together housing design in which the front housing 206 and back housing 220 may be snapped together. In some aspects, the full assembly process may be performed at a single external electronics house. However, this is not required, and, in alternative aspects, the transceiver assembly process may be performed at one or more electronics houses, which may be internal, external, or a combination thereof. In some aspects, the assembled transceiver 101 may be programmed and functionally tested. In some aspects, assembled transceivers 101 may be packaged into their final shipping containers and be ready for sale.

In some aspects, as illustrated in FIGS. 3 and 4, the antenna 103 may be contained within the housing 206 and 220 of the transceiver 101. In some aspects, the antenna 103 in the transceiver 101 may be small and/or flat so that the antenna 103 fits within the housing 206 and 220 of a small, lightweight transceiver 101. In some aspects, the transceiver 101 may be suitable for placement, for example, on an abdomen area, upper-arm, wrist, or thigh of a patient body. In some aspects, the transceiver 101 may be suitable for attachment to a patient body by means of a biocompatible patch. Although, in some aspects, the antenna 103 may be contained within the housing 206 and 220 of the transceiver 101, this is not required, and, in some alternative aspects, a portion or all of the antenna 103 may be located external to the transceiver housing. For example, in some alternative aspects, antenna 103 may wrap around a user's wrist, arm, leg, or waist such as, for example, the antenna described in U.S. Pat. No. 8,073,548, which is incorporated herein by reference in its entirety.

Figure 5:
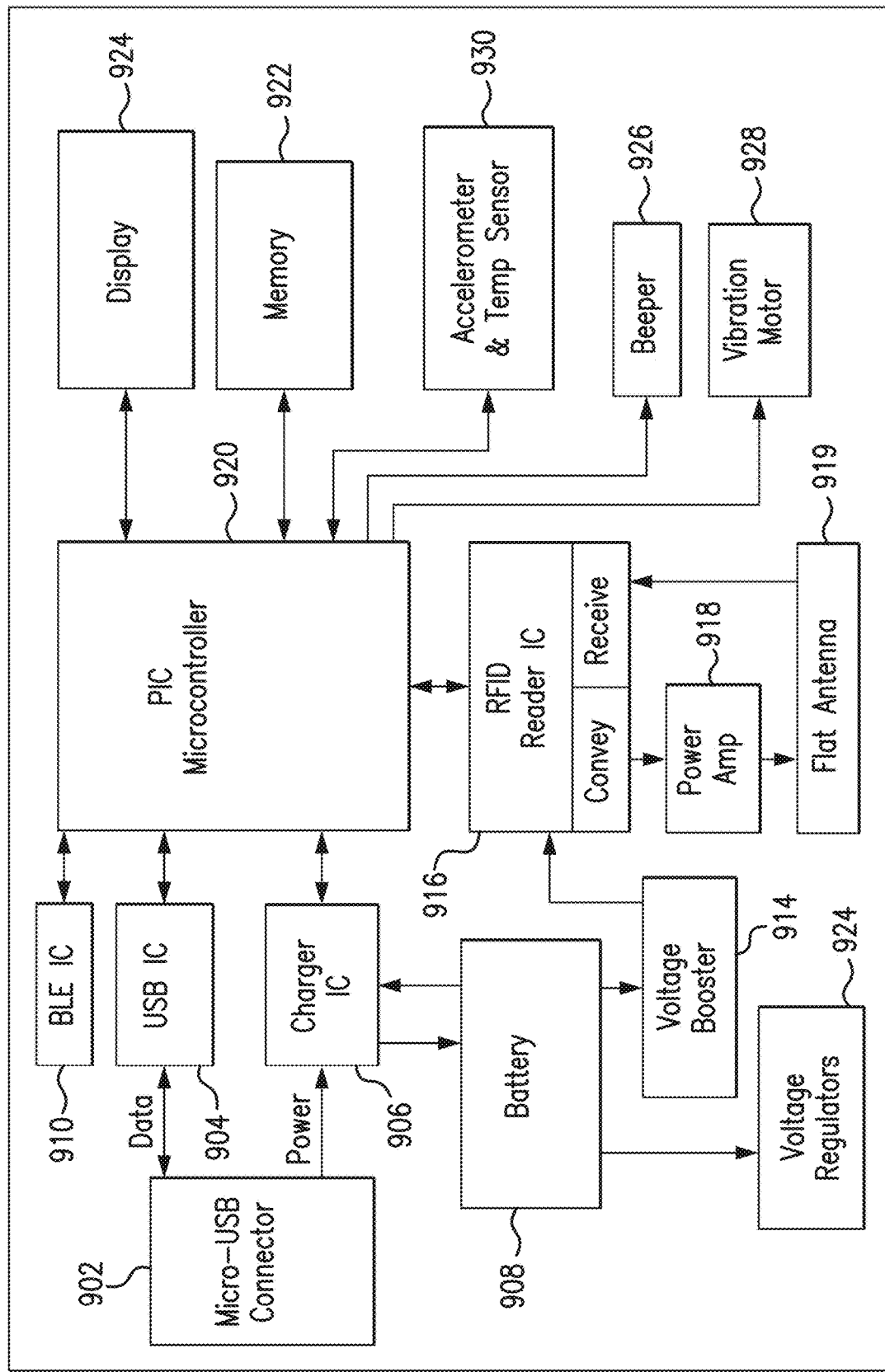
FIG. 5 is a schematic view illustrating a transceiver embodying aspects of the present invention.

FIG. 5 is a schematic view of an external transceiver 101 according to a non-limiting embodiment. In some aspects, the transceiver 101 may have a connector 902, such as, for example, a Micro-Universal Serial Bus (USB) connector. The connector 902 may enable a wired connection to an external device, such as a personal computer or a display device 105 (e.g., a smartphone).

The transceiver 101 may exchange data to and from the external device through the connector 902 and/or may receive power through the connector 902. The transceiver 101 may include a connector integrated circuit (IC) 904, such as, for example, a USB-IC, which may control transmission and receipt of data through the connector 902. The transceiver 101 may also include a charger IC 906, which may receive power via the connector 902 and charge a battery 908 (e.g., lithium-polymer battery). In some aspects, the battery 908 may be rechargeable, may have a short recharge duration, and/or may have a small size.

In some aspects, the transceiver 101 may include one or more connectors in addition to (or as an alternative to) Micro-USB connector 904. For example, in one alternative embodiment, the transceiver 101 may include a spring-based connector (e.g., Pogo pin connector) in addition to (or as an alternative to) Micro-USB connector 904, and the transceiver 101 may use a connection established via the spring-based connector for wired communication to a personal computer or a display device 105 (e.g., a smartphone) and/or to receive power, which may be used, for example, to charge the battery 908.

In some aspects, the transceiver 101 may have a wireless communication IC 910, which enables wireless communication with an external device, such as, for example, one or more personal computers or one or more display devices 105 (e.g., a smartphone). In some aspects, the wireless communication IC 910 may employ one or more wireless communication standards to wirelessly transmit data. The wireless communication standard employed may be any suitable wireless communication standard, such as an ANT standard, a Bluetooth standard, or a Bluetooth Low Energy (BLE) standard (e.g., BLE 4.0). In some aspects, the wireless communication IC 910 may be configured to wirelessly transmit data at a frequency greater than 1 gigahertz (e.g., 2.4 or 5 GHz). In some aspects, the wireless communication IC 910 may include an antenna (e.g., a Bluetooth antenna). In some aspects, the antenna of the wireless communication IC 910 may be entirely contained within the housing (e.g., housing 206 and 220) of the transceiver 101. However, this is not required, and, in alternative aspects, all or a portion of the antenna of the wireless communication IC 910 may be external to the transceiver housing.

In some aspects, the transceiver 101 may include a display interface device, which may enable communication by the transceiver 101 with one or more display devices 105. In some aspects, the display interface device may include the antenna of the wireless communication IC 910 and/or the connector 902. In some aspects, the display interface device may additionally include the wireless communication IC 910 and/or the connector IC 904.

In some aspects, the transceiver 101 may include voltage regulators 912 and/or a voltage booster 914. The battery 908 may supply power (via voltage booster 914) to radio-frequency identification (RFID) reader IC 916, which uses the inductor 103 to convey information (e.g., commands) to the sensor 101 and receive information (e.g., measurement information) from the sensor 100. In some aspects, the sensor 100 and transceiver 101 may communicate using near field communication (NFC) (e.g., at a frequency of 13.56 MHz). In the illustrated embodiment, the inductor 103 is a flat antenna 919. In some aspects, the antenna may be flexible. However, as noted above, the inductor 103 of the transceiver 101 may be in any configuration that permits adequate field strength to be achieved when brought within adequate physical proximity to the inductor 114 of the sensor 100. In some aspects, the transceiver 101 may include a power amplifier 918 to amplify the signal to be conveyed by the inductor 103 to the sensor 100.

The transceiver 101 may include a processor 920 and a memory 922 (e.g., Flash memory). In some aspects, the memory 922 may be non-volatile and/or capable of being electronically erased and/or rewritten. In some aspects, the processor 920 may be, for example and without limitation, a peripheral interface controller (PIC) microcontroller. In some aspects, the processor 920 may control the overall operation of the transceiver 101. For example, the processor 920 may control the connector IC 904 or wireless communication IC 910 to transmit data via wired or wireless communication and/or control the RFID reader IC 916 to convey data via the inductor 103. The processor 920 may also control processing of data received via the inductor 103, connector 902, or wireless communication IC 910.

In some aspects, the transceiver 101 may include a sensor interface device, which may enable communication by the transceiver 101 with a sensor 100. In some aspects, the sensor interface device may include the inductor 103. In some aspects, the sensor interface device may additionally include the RFID reader IC 916 and/or the power amplifier 918. However, in some alternative aspects where there exists a wired connection between the sensor 100 and the transceiver 101 (e.g., transcutaneous aspects), the sensor interface device may include the wired connection.

In some aspects, the transceiver 101 may include a display 924 (e.g., liquid crystal display and/or one or more light emitting diodes), which the processor 920 may control to display data (e.g., analyte levels). In some aspects, the transceiver 101 may include a speaker 926 (e.g., a beeper) and/or vibration motor 928, which may be activated, for example, in the event that an alarm condition (e.g., detection of a hypoglycemic or hyperglycemic condition) is met. The transceiver 101 may also include one or more additional sensors 930, which may include an accelerometer and/or temperature sensor that may be used in the processing performed by the processor 920.

In some aspects, the transceiver 101 may be a body-worn transceiver that is a rechargeable, external device worn over the sensor implantation or insertion site. In some aspects, the transceiver 101 may supply power to the proximate sensor 100. In some aspects, power may be supplied to the sensor 100 through an inductive link (e.g., an inductive link of 13.56 MHz). However, it is not required that the sensor 100 receive power from the transceiver 101 (e.g., in the case of a battery-powered sensor). In some aspects, the transceiver 101 may be placed using an adhesive patch or a specially designed strap or belt. The external transceiver 101 may read measured analyte data from a subcutaneous sensor 100 (e.g., up to a depth of 2 cm or more).

In some aspects, the transceiver 100 may receive sensor data (e.g., measurement information such as, for example and without limitation, light measurements and/or temperature measurements) from the sensor 100. In some aspects, the transceiver 101 may periodically (e.g., every 2, 5, or 10 minutes) read sensor data. However, this is not required, and, in some alternative aspects, the transceiver 101 may read sensor data on-demand (e.g., by swiping or bringing the transceiver 101 in proximity to the sensor 101). In some aspects, the transceiver 101 may calculate analyte levels (e.g., analyte concentrations) using at least the received sensor data. In some aspects, the transceiver 101 may calculate analyte level rate of change information (e.g., analyte concentration trends) using the calculated analyte levels and/or the received sensor data. In some aspects, the transceiver 101 may transmit one or more of the calculated analyte levels and the calculated analyte level rate of change information to a display device 105 (see FIG. 1). In some aspects, the transceiver 101 may also determine if an alert and/or alarm condition exists and generate one or more alerts or alarms, which may be signaled to the user (e.g., through vibration by vibration motor 928 and/or an LED of the transceiver's display 924 and/or a user interface of a display device 105).

In some aspects, the transceiver 101 may convey information (e.g., one or more of sensor data, calculated analyte levels, calculated analyte level rates of change, alerts, alarms, and notifications) may be transmitted to a display device 105 (e.g., via Bluetooth Low Energy with Advanced Encryption Standard (AES)-Counter CBC-MAC (CCM) encryption) for display by a mobile medical application (MMA) being executed by the display device 105. In some aspects, the MMA may generate alarms, alerts, and/or notifications (in addition to or as an alternative to receiving alerts, alarms, and/or notifications from the transceiver 101). In one embodiment, the MMA may be configured to provide push notifications. In some aspects, the transceiver 101 may have a power button (e.g., button 208) to allow the user to turn the device on or off, reset the device, or check the remaining battery life. In some aspects, the transceiver 101 may have a button, which may be the same button as a power button or an additional button, to suppress one or more user notification signals (e.g., vibration, visual, and/or audible) of the transceiver 101 generated by the transceiver 101 in response to detection of an alert or alarm condition.

In some aspects, the transceiver 101 of the analyte monitoring system 50 may receive raw signals indicative of an amount or concentration of an analyte in proximity to the analyte indicator 106 of the analyte sensor 100. In some aspects, the transceiver 101 may receive the raw signals from the sensor 100 periodically (e.g., every 5, 10, or 20 minutes). In some aspects, the raw signals may include one or more measurements indicative of an analyte level (e.g., one or more measurements of the amount of emission light 331 that is emitted by the indicator molecules 104 and received by the photodetector 224) and/or one or more temperature measurements (e.g., as measured by the temperature transducer 670). In some aspects, the transceiver 101 may use the received raw signals to calculate analyte levels. In some aspects, the transceiver 100 may store one or more calculated analyte levels (e.g., in memory 922). In some aspects, the transceiver 100 may convey one or more calculated analyte levels to the display device 105.

In some aspects, as noted above, the transceiver 101 may calculate one or more of analyte levels and analyte level rates of change and/or may generate one or more of alerts, alarms, and notifications. However, it is not required that the transceiver 101 perform the calculations and/or generate the alerts, alarms, and notifications itself, and, in some alternative aspects, the transceiver 101 may instead convey/relay the measurement information received from the sensor 100 to another device (e.g., display device 105) for calculation of one or more of analyte levels and analyte level rates of change and/or generation one or more of alerts, alarms, and notifications (e.g., by a mobile medical application executing on the display device 105). In some alternative aspects, the transceiver 101 may calculate analyte levels using at least sensor data received from the sensor 100 and convey the calculated analyte levels to the display device 105, and the display device 105 may calculate analyte level rates of change using at least the received analyte levels and/or generate one or more of alerts, alarms, and notifications using at least the received analyte levels.

Figure 6:
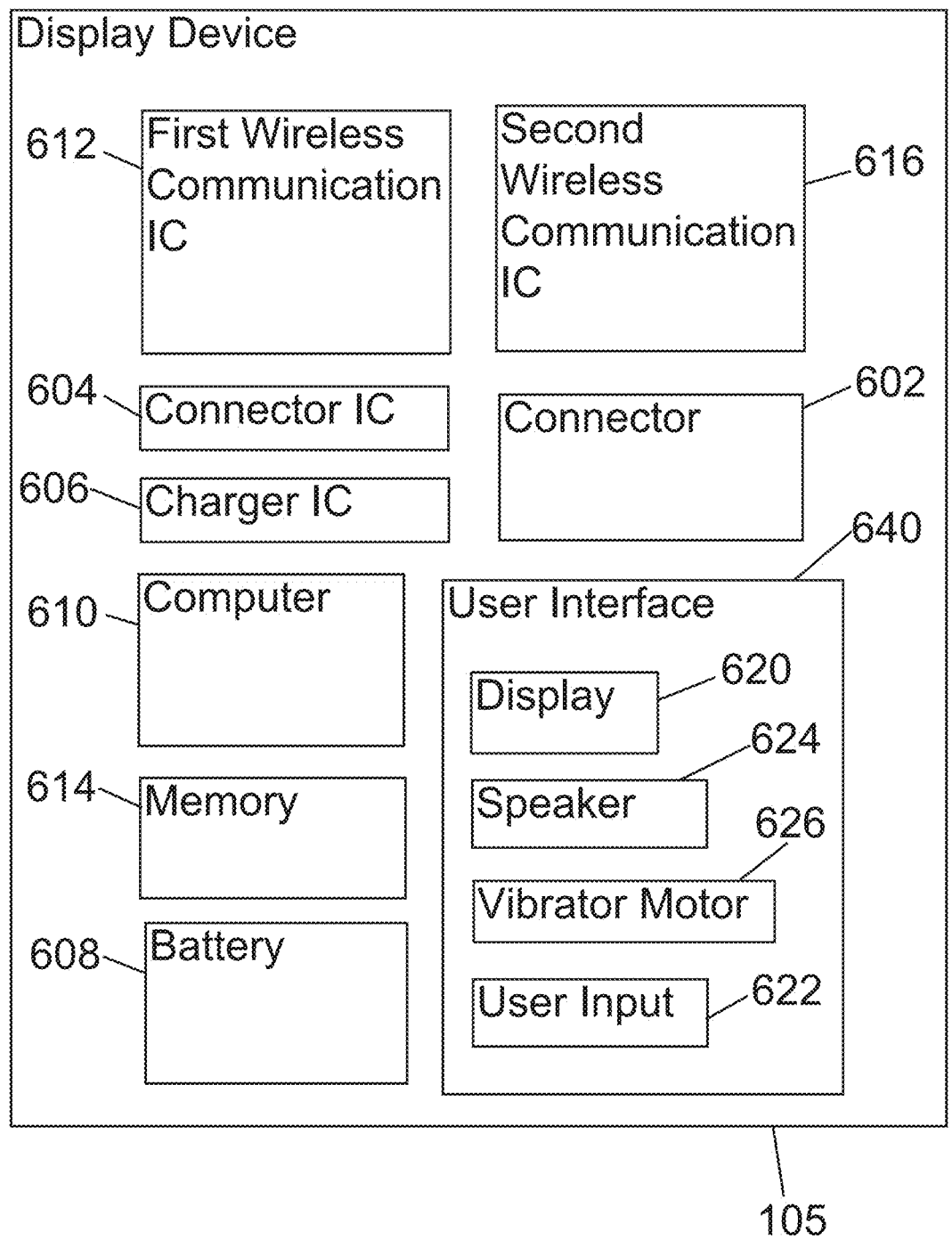
FIG. 6 illustrates a block diagram of a display device of the analyte monitoring system embodying aspects of the present invention.

FIG. 6 is a block diagram of a non-limiting embodiment of the display device 105 of the analyte monitoring system 50. As shown in FIG. 6, in some aspects, the display device 105 may include one or more of a connector 602, a connector integrated circuit (IC) 604, a charger IC 606, a battery 608, a computer 610, a first wireless communication IC 612, a memory 614, a second wireless communication IC 616, and a user interface 640.

In some aspects in which the display device 105 includes the connector 602, the connector 602 may be, for example and without limitation, a Micro-Universal Serial Bus (USB) connector. The connector 602 may enable a wired connection to an external device, such as a personal computer or transceiver 101 (e.g., via the connector 902 of the transceiver 101). The display device 105 may exchange data to and from the external device through the connector 602 and/or may receive power through the connector 602. In some aspects, the connector IC 604 may be, for example and without limitation, a USB-IC, which may control transmission and receipt of data through the connector 602.

In some aspects in which the display device 105 includes the charger IC 606, the charger IC 606 may receive power via the connector 602 and charge the battery 608. In some aspects, the battery 608 may be, for example and without limitation, a lithium-polymer battery. In some aspects, the battery 608 may be rechargeable, may have a short recharge duration, and/or may have a small size.

In some aspects, the display device 105 may include one or more connectors and/or one or more connector ICs in addition to (or as an alternative to) connector 602 and connector IC 604. For example, in some alternative aspects, the display device 105 may include a spring-based connector (e.g., Pogo pin connector) in addition to (or as an alternative to) connector 602, and the display device 105 may use a connection established via the spring-based connector for wired communication to a personal computer or the transceiver 101 and/or to receive power, which may be used, for example, to charge the battery 608.

In some aspects in which the display device 105 includes the first wireless communication IC 612, the first wireless communication IC 612 may enable wireless communication with one or more external devices, such as, for example, one or more personal computers, one or more transceivers 101, one or more other display devices 105, and/or one or more other devices (e.g., one or more wearable devices). In some aspects, the first wireless communication IC 612 may employ one or more wireless communication standards to wirelessly transmit data. The wireless communication standard employed may be any suitable wireless communication standard, such as an ANT standard, a Bluetooth standard, or a Bluetooth Low Energy (BLE) standard (e.g., BLE 4.0). In some aspects, the first wireless communication IC 612 may be configured to wirelessly transmit data at a frequency greater than 1 gigahertz (e.g., 2.4 or 5 GHz). In some aspects, the first wireless communication IC 612 may include an antenna (e.g., a Bluetooth antenna). In some aspects, the antenna of the first wireless communication IC 612 may be entirely contained within a housing of the display device 105. However, this is not required, and, in alternative aspects, all or a portion of the antenna of the first wireless communication IC 612 may be external to the display device housing.

In some aspects, the display device 105 may include a transceiver interface device, which may enable communication by the display device 105 with one or more transceivers 101. In some aspects, the transceiver interface device may include the antenna of the first wireless communication IC 612 and/or the connector 602. In some aspects, the transceiver interface device may additionally or alternatively include the first wireless communication IC 612 and/or the connector IC 604.

In some aspects in which the display device 105 includes the second wireless communication IC 616, the second wireless communication IC 616 may enable the display device 105 to communicate with the DMS and/or one or more remote devices (e.g., smartphones, servers, and/or personal computers) via wireless local area networks (e.g., Wi-Fi), cellular networks, and/or the Internet. In some aspects, the second wireless communication IC 616 may employ one or more wireless communication standards to wirelessly transmit data. In some aspects, the second wireless communication IC 616 may include one or more antennas (e.g., a Wi-Fi antenna and/or one or more cellular antennas). In some aspects, the one or more antennas of the second wireless communication IC 616 may be entirely contained within a housing of the display device 105. However, this is not required, and, in alternative aspects, all or a portion of the one or more antennas of the second wireless communication IC 616 may be external to the display device housing.

In some aspects in which the display device 105 includes the memory 614, the memory 614 may be non-volatile and/or capable of being electronically erased and/or rewritten. In some aspects, the memory 614 may be, for example and without limitations a Flash memory.

In some aspects in which the display device 105 includes the computer 610, the computer 610 may control the overall operation of the display device 105. For example, the computer 610 may control the connector IC 604, the first wireless communication IC 612, and/or the second wireless communication IC 616 to transmit data via wired or wireless communication. The computer 610 may additionally or alternatively control processing of received data (e.g., analyte monitoring data received from the transceiver 101).

In some aspects in which the display device 105 includes the user interface 640, the user interface 640 may include one or more of a display 620 and a user input 622. In some aspects, the display 620 may be a liquid crystal display (LCD) and/or light emitting diode (LED) display. In some aspects, the user input 622 may include one or more buttons, a keyboard, a keypad, and/or a touchscreen. In some aspects, the computer 610 may control the display 620 to display data (e.g., analyte levels, analyte level rate of change information, alerts, alarms, and/or notifications). In some aspects, the user interface 640 may include one or more of a speaker 624 (e.g., a beeper) and a vibration motor 626, which may be activated, for example, in the event that a condition (e.g., a hypoglycemic or hyperglycemic condition) is met.

In some aspects, the computer 610 may execute a mobile medical application (MMA). In some aspects, the display device 105 may receive analyte monitoring data from the transceiver 101. In some aspects, the received analyte monitoring data may include one or more analyte levels, one or more analyte level rates of change, and/or sensor data (e.g., one or more sensor measurements). In some aspects, the received analyte monitoring data may additionally or alternatively include alarms, alerts, and/or notifications. In some aspects, the MMA may display some or all of the received analyte monitoring data on the display 620 of the display device 105. In some alternative aspects, the received analyte monitoring data may include sensor data (e.g., one or more sensor measurements) and does not include analyte levels, and the display device 105 may calculate one or more analyte levels using the sensor data. In some alternative aspects, the received analyte monitoring data may include one or more analyte levels but does not include analyte level rates of change, and the display device 105 may calculate one or more analyte level rates of change using the one or more analyte levels. In some alternative aspects, the display device 105 may calculate one or more analyte levels and calculate one or more analyte level rates of change using at least the one or more analyte levels calculated by the display device 105.

Figure 7:
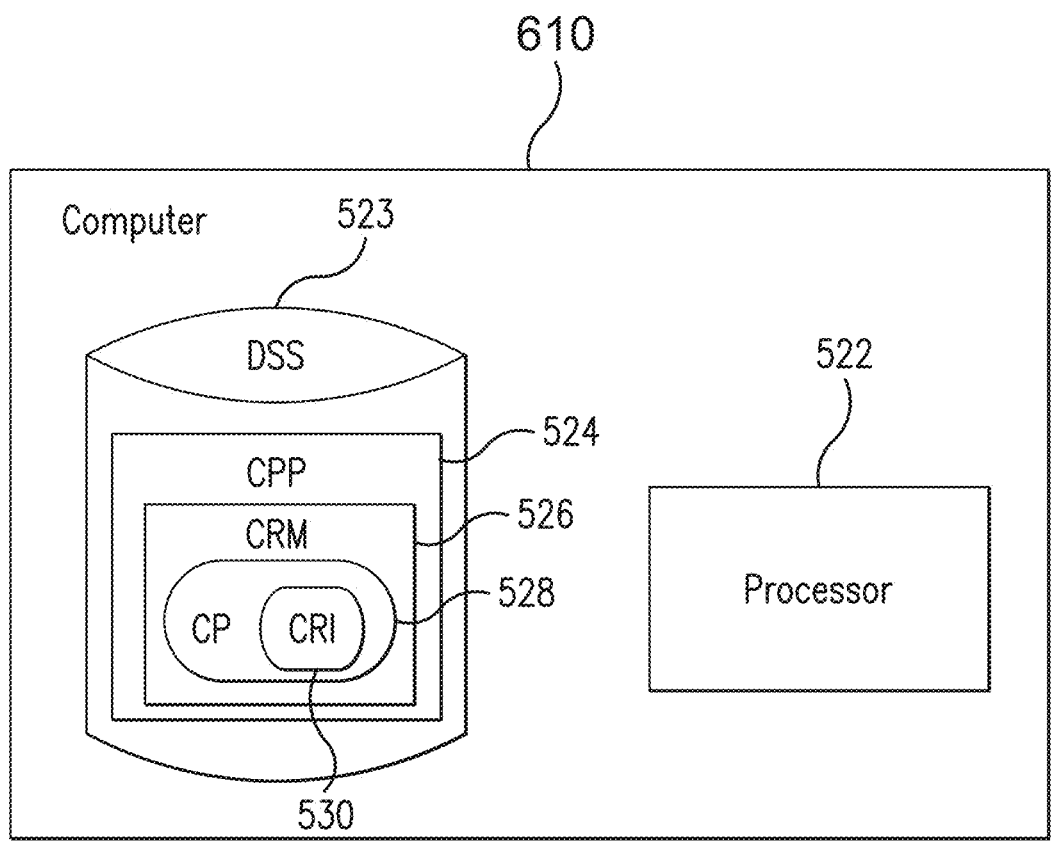
FIG. 7 illustrates a block diagram of a computer of the display device of the analyte monitoring system embodying aspects of the present invention.

FIG. 7 is a block diagram of a non-limiting embodiment of the computer 610 of the analyte monitoring system 50. As shown in FIG. 7, in some aspects, the computer 610 may include one or more processors 522 (e.g., a general purpose microprocessor) and/or one or more circuits, such as an application specific integrated circuit (ASIC), field-programmable gate arrays (FPGAs), a logic circuit, and the like. In some aspects, the computer 610 may include a data storage system (DSS) 523. The DSS 523 may include one or more non-volatile storage devices and/or one or more volatile storage devices (e.g., random access memory (RAM)). In aspects where the computer 610 includes a processor 522, the DSS 523 may include a computer program product (CPP) 524. CPP 524 may include or be a computer readable medium (CRM) 526. The CRM 526 may store a computer program (CP) 528 comprising computer readable instructions (CRI) 530. In some aspects, the CRM 526 may store, among other programs, the MMA, and the CRI 530 may include one or more instructions of the MMA. The CRM 526 may be a non-transitory computer readable medium, such as, but not limited, to magnetic media (e.g., a hard disk), optical media (e.g., a DVD), solid state devices (e.g., random access memory (RAM) or flash memory), and the like. In some aspects, the CRI 530 of computer program 528 may be configured such that when executed by processor 522, the CRI 530 causes the computer 610 to perform steps described below (e.g., steps described below with reference to the MMA). In other aspects, the computer 610 may be configured to perform steps described herein without the need for a computer program. That is, for example, the computer 610 may consist merely of one or more ASICs. Hence, the features of the aspects described herein may be implemented in hardware and/or software.

In some aspects in which the user interface 640 of the display device 105 includes the display 618, the MMA may cause the display device 105 to provide a series of graphical control elements or widgets in the user interface 640, such as a graphical user interface (GUI), shown on the display 618. The MMA may, for example without limitation, cause the display device 105 to display analyte related information in a GUI such as, but not limited to: one or more of analyte information, current analyte levels, past analyte levels, predicted analyte levels, user notifications, analyte status alerts and alarms, trend graphs, analyte level rate of change or trend arrows, and user-entered events. In some aspects, the MMA may provide one or more graphical control elements that may allow a user to manipulate aspects of the one or more display screens. Although aspects of the MMA are illustrated and described in the context of glucose monitoring system aspects, this is not required, and, in some alternative aspects, the MMA may be employed in other types of analyte monitoring systems.

In some aspects where the display device 105 communicates with a transceiver 101, which in turn obtains sensor data from the analyte sensor 100, the MMA may cause the display device 105 to receive and display one or more of analyte data, trends, graphs, alarms, and alerts from the transceiver 101. In some aspects, the MMA may store analyte level history and statistics for a patient on the display device 105 (e.g., in memory 614 and/or DSS 533) and/or in a remote data storage system.

In some aspects, the analyte monitoring system 50 may calibrate the conversion of raw sensor measurements to analyte levels (e.g., analyte concentrations). In some aspects, the calibration may be performed approximately periodically (e.g., every 6, 12, or 24 hours). In some aspects, the calibration may be performed using one or more reference analyte level measurements (e.g., one or more self-monitoring blood glucose (SMBG) measurements). In some aspects, the reference analyte level measurements may be entered into the analyte monitoring system 50 using the user interface 640 of the display device 105. In some aspects, the display device 105 may convey one or more reference analyte level measurements to the transceiver 101, and the transceiver 101 may use the one or more received reference analyte level measurements to perform the calibration. In some alternative aspects (e.g., aspects in which the display device 105 calculates one or more analyte levels), the display device 105 may use the one or more received reference analyte level measurements to perform the calibration.

Figure 8:
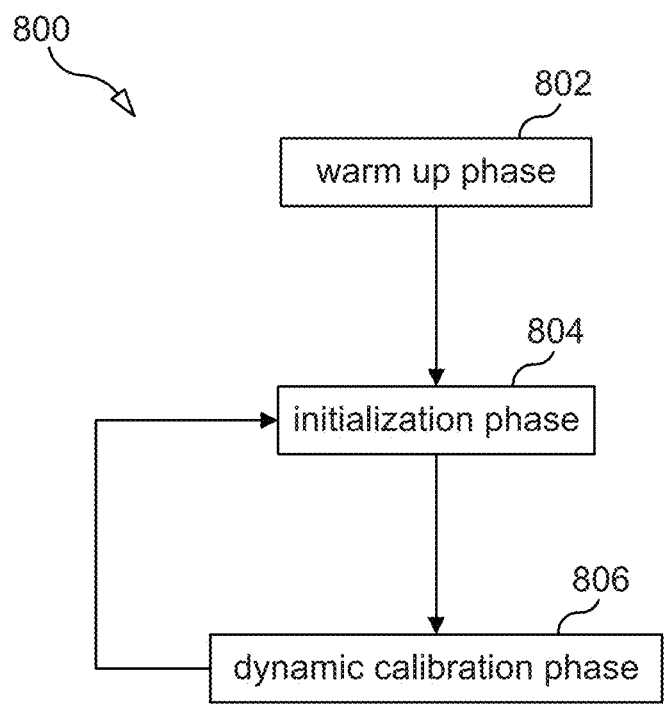
FIG. 8 is a flow chart illustrating an initialization and calibration control process embodying aspects of the present invention.

FIG. 8 is a flow chart illustrating a process 800 for controlling initialization and calibration of an analyte monitoring system 50. In some aspects, the analyte monitoring system 50 may perform the control process 800. In some aspects, the transceiver 101 (e.g., the PIC microcontroller 920 of the transceiver 101) may perform one or more steps of the control process 800. In some aspects, the display device 105 (e.g., the computer 610 of the display device 105) may perform one or more steps of the control process 800. Although the control process 800 is described below as being performed by the transceiver 101 alone, this is not required, and, in some alternative aspects, the display device 105 alone or in combination with the transceiver 101 may perform the control process 800.

In some aspects, the process 800 may begin after insertion or implantation of the analyte sensor 100. In some aspects, the process 800 may include a warm up phase 802, an initialization phase 804, and/or a dynamic calibration phase 806. In some aspects, calibration may be performed at different frequencies during different phases. In some aspects, calibration may be performed at a first calibration frequency or a second calibration frequency during the dynamic calibration phase 806 and at a third calibration frequency during the initialization phase 804. In some aspects, the first, second, and third calibration frequencies may be different. In some aspects, the first calibration frequency may be lower than the second calibration frequency, and the second calibration frequency may be lower than the third calibration frequency. In some aspects, the first calibration frequency may be, for example and without limitation, daily calibration (e.g., one per day at approximately 24-hour intervals). In some aspects, the second calibration frequency may be, for example and without limitation, twice-daily calibration (e.g., two per day at approximately 12-hour intervals). In some aspects, the third calibration frequency may be, for example and without limitation, four calibration per day (e.g., at approximately 6-hour intervals).

In some aspects, the process 800 may begin with a warm up phase 802 in which the transceiver 101 allows the sensor 100 to adjust to being fully or partially in the body. In some aspects, the warm up phase 802 may give the analyte indicator 106 time to hydrate. In some aspects, the transceiver 101 stays in the warm up phase 802 for a predetermined period of time such as, for example and without limitation, 12 or 24 hours. However, this is not required, and, in some alternative aspects, the transceiver 101 may monitor sensor conditions during the warm up phase 802 and exit the warm up phase 802 after the sensor conditions have stabilized. In some aspects, after completion of the warm up phase 802, the process 800 may proceed to an initialization phase 804. In some alternative aspects, the warm up phase 802 may not be necessary (e.g., when the analyte sensor 100 is an external sensor or does not need time to acclimate to being inside the body). In these alternative aspects, the process 800 may begin in an initialization phase 804.

In some aspects, in the initialization phase 804, the transceiver 101 may receive sensor data. In some aspects, the transceiver 101 may receive the sensor data periodically (e.g., every 2, 5, or 10 minutes). In some aspects, in the initialization phase 804, the transceiver 101 may receive one or more reference analyte level measurements. In some aspects, the transceiver 101 may receive three or more reference analyte level measurements in the initialization phase 804. In some aspects, the transceiver 101 may receive the reference analyte level measurements at the third calibration frequency (e.g., periodically at approximately every 6 hours). In some aspects, the transceiver 101 may store the reference analyte level measurements in a calibration point memory, which may be, for example and without limitation, a circular buffer. In some aspects, the transceiver 101 may use the one or more reference analyte level measurements as calibration points to perform an initial calibration of the conversion function used to calculate analyte levels from the sensor data. In some aspects, the transceiver 101 may receive the one or more reference analyte level measurements from the display device 105. In some aspects, the transceiver 101 may cause the display device 105 to prompt a user for the one or more reference analyte level measurements (e.g., using one or more of the display 620, speaker 624, and vibration motor 626 of the user interface 640 of the display device 105) at the third calibration frequency, and, in response to the prompts, the user may enter the one or more reference analyte level measurements into the display device 105 (e.g., using the user input 622 of the user interface 640 of the display device 105).

In some aspects, during the initialization phase 804, no calculated analyte levels are displayed to the user. In some aspects, after the completion of the initialization phase 804, the process 800 may proceed to the dynamic calibration phase 806.

In some aspects, in the dynamic calibration phase 806, the transceiver 101 may receive sensor data and calculate analyte levels using the conversion function and the received sensor data. In some aspects, the transceiver 101 may receive the sensor data periodically (e.g., every 2, 5, or 10 minutes). In some aspects, the transceiver 101 may display one or more calculated analyte levels. In some aspects, in the dynamic calibration phase 806, the transceiver 101 may display the one or more analyte levels by transmitting them to the display device 105 for display.

In some aspects, in the dynamic calibration phase 806, the transceiver 101 may receive one or more reference analyte level measurements. In some aspects, the transceiver 101 may receive the reference analyte level measurements at a dynamic calibration frequency. In some aspects, the dynamic calibration frequency may be at the first calibration frequency (e.g., daily at periodic intervals of approximately every 24 hours) or the second calibration frequency (e.g., twice-daily at periodic intervals of approximately every 12 hours). In some aspects, the first and second calibration frequencies may be different. In some aspects, the first and second calibration frequencies may be less than the third calibration frequency used during the initialization phase 804. In some aspects, the first calibration frequency may be lower than the second calibration frequency. In some aspects, in the dynamic calibration phase 806, the transceiver 101 may cause the display device 105 to prompt a user for the one or more reference analyte level measurements at the dynamic calibration frequency (e.g., at the first or second calibration frequency), and, in response, the user may enter the one or more reference analyte level measurements into the display device 105. In some aspects, the dynamic calibration phase 806 may include one or more calibration frequencies in addition to the first and second calibration frequencies.

In some aspects, in the dynamic calibration phase 806, the transceiver 101 may determine whether to accept a reference analyte level measurement. In some aspects, if the transceiver 101 determines that the reference analyte level measurement is acceptable, the transceiver 101 may calibrate (or re-calibrate or update) the conversion function using the reference point as a calibration point. In some aspects, if the transceiver 101 determines that a reference analyte level measurement is not acceptable, the transceiver 101 may cause the display device 105 to prompt the user for another reference analyte level measurement.

In some aspects, the transceiver 101 may determine to re-initialize the analyte monitoring system 50 and proceed from the dynamic calibration phase 806 back to the initialization phase 804. In some aspects, the transceiver 101 may determine to re-initialize the analyte monitoring system 50, for example and without limitation, because too many unacceptable reference analyte level measurements were received and/or because a degradation rate of the analyte indicator 106 of the analyte sensor 100 is too high.

In some aspects, if the transceiver 101 determines to re-initialize the analyte monitoring system 50, the process 800 may proceed from the dynamic calibration phase 806 to a sensor dropout phase (not shown) before proceeding to the initialization phase 804. In some aspects, in the sensor dropout phase, the transceiver 101 may receive sensor data from the sensor 100, but no analyte measurements are displayed to the user. In some aspects, the process 800 may remain in the dropout phase 610 for a period of time (e.g., at least six hours) before proceeding back to the initialization phase 804. However, the sensor dropout phase is not necessary, and, in some alternative aspects, the process 800 may proceed directly to the initialization phase 804 from the dynamic calibration phase 806 if the transceiver 101 determines to re-initialize the analyte monitoring system 50.

Figure 9A:
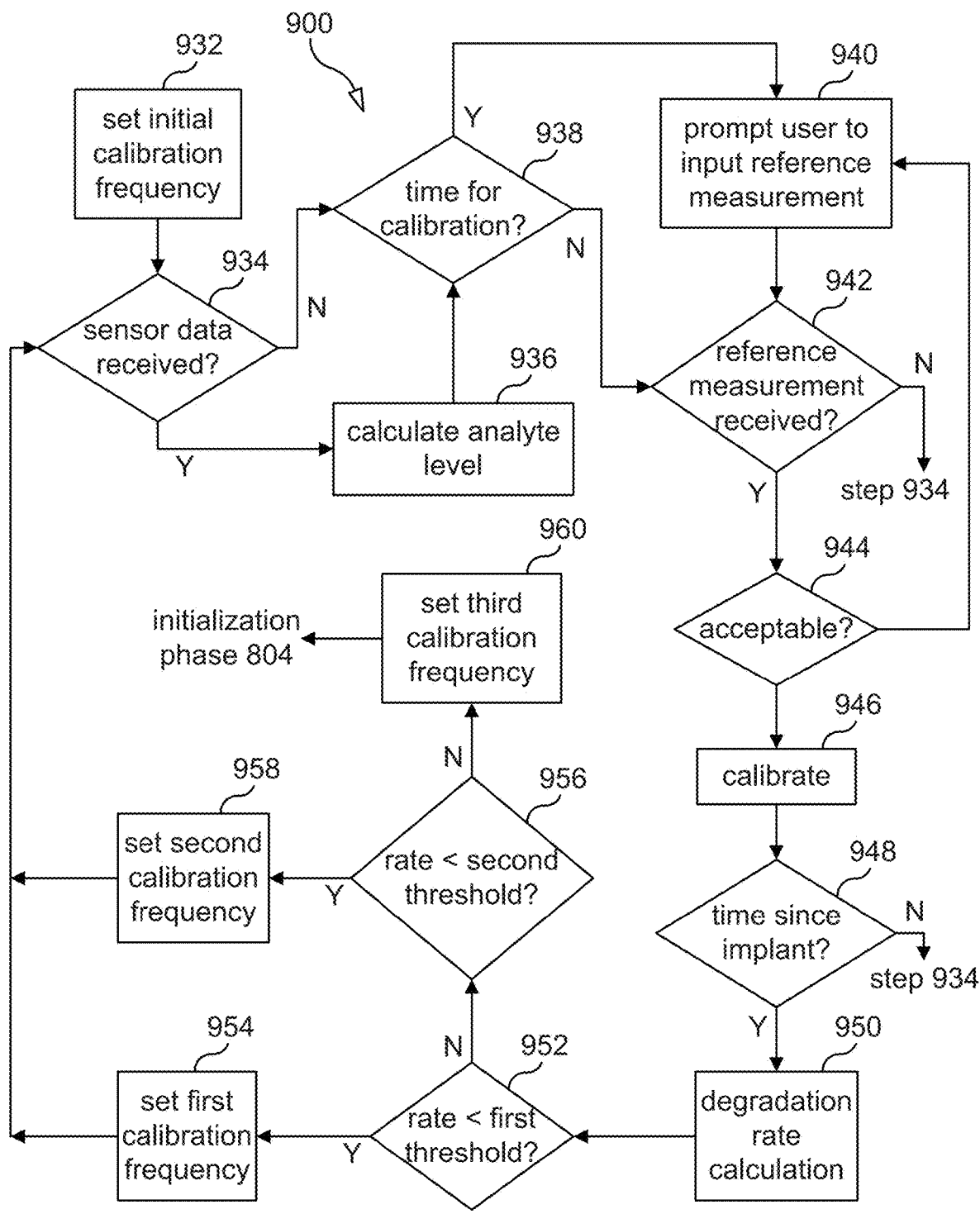
FIGS. 9A and 9B are flow charts illustrating dynamic calibration processes embodying aspects of the present invention.

FIG. 9A is a flow chart illustrating a dynamic calibration process 900a, which may be performed during the dynamic calibration phase 806 of the control process 800 illustrated in FIG. 8. In some aspects, the analyte monitoring system 50 may perform the dynamic calibration process 900a. In some aspects, the transceiver 101 (e.g., the PIC microcontroller 920 of the transceiver 101) may perform one or more steps of the dynamic calibration process 900a. In some aspects, the display device 105 (e.g., the computer 610 of the display device 105) may perform one or more steps of the dynamic calibration process 900a. Although the dynamic calibration process 900a is described below as being performed by the transceiver 101 alone, this is not required, and, in some alternative aspects, the display device 105 alone or in combination with the transceiver 101 may perform the dynamic calibration process 900a.

Figure 10A:
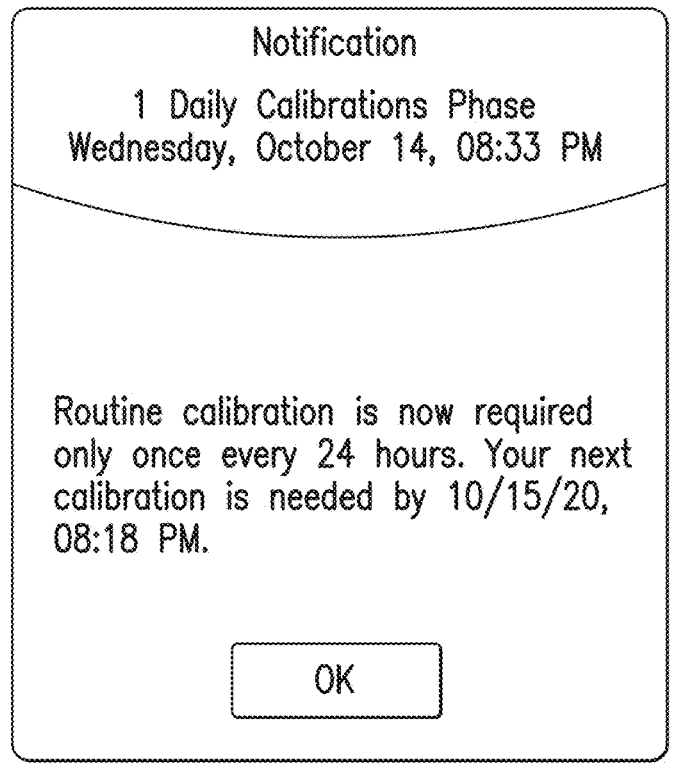
FIGS. 10A and 10B illustrate indications of a dynamic calibration frequency embodying aspects of the present invention.
Figure 10B:
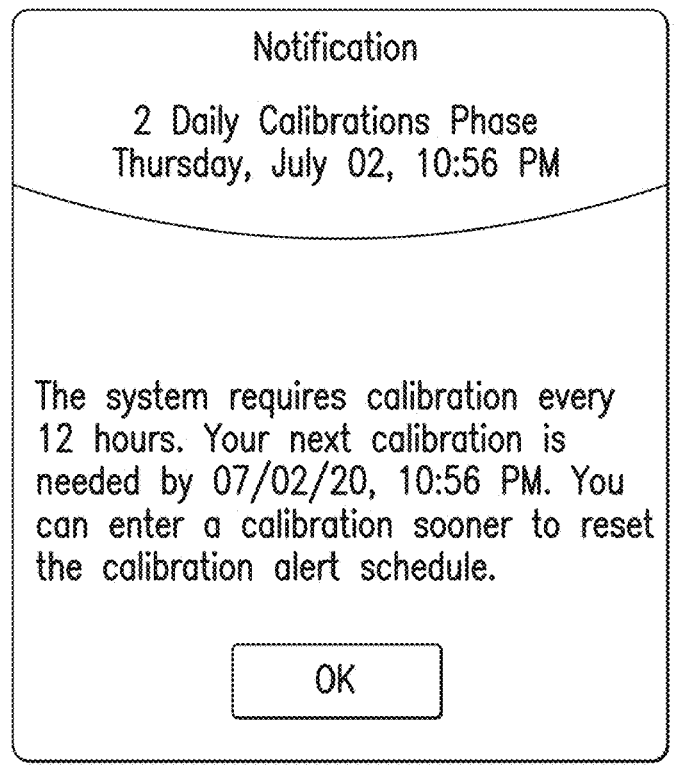

In some aspects, the process 900a may include a step 932 in which the transceiver 101 sets a dynamic calibration frequency at an initial calibration frequency. In some aspects, in step 932, the transceiver 101 may set the second calibration frequency (e.g., a twice-daily calibration frequency) as the initial calibration frequency. In some aspects, the step 932 may include providing an indication of the initial calibration frequency to a user of the analyte sensor 100. In some aspects, the transceiver 101 may cause the display device 105 to provide the indication of the initial calibration frequency (e.g., using the display 620 of the user interface 640 of the display device 105). In some aspects, the indication of the initial calibration may, for example and without limitation, be as shown in FIG. 10B.

In some aspects, the process 900a may include a step 934 in which the transceiver 101 determines whether the transceiver 101 has received sensor data (e.g., one or more sensor measurements including, for example, light and/or temperature measurements) conveyed by the sensor 100. In some aspects, the transceiver 101 may receive the sensor data following a command (e.g., a measurement command or a read sensor data command) conveyed by the transceiver 101 to the sensor 100. However, this is not required, and, in some alternative aspects, the sensor 100 may control when sensor data is conveyed to the transceiver 101, or the sensor 100 may continuously convey sensor data to the transceiver 101. In some non-limiting aspects, the transceiver 101 may receive the sensor data periodically (e.g., every 1, 2, 5, or 10 minutes). In some aspects, the transceiver 101 may receive the sensor data wirelessly. For example and without limitation, in some aspects, the transceiver 101 may receive the sensor data by detecting modulations in an electromagnetic wave generated by the sensor 100, e.g., by detecting modulations in the current flowing through the coil 103 of the transceiver 101. However, this is not required, and, in some alternative aspects, the transceiver 101 may receive the sensor data via a wired connection to the sensor 100. In some aspects, if the transceiver 101 has received sensor data, the dynamic calibration process 900a may proceed from step 934 to an analyte level calculation step 936. In some aspects, if the transceiver 101 has not received sensor data, the dynamic calibration process 900a may proceed from step 934 to a step 938.

In some aspects, the dynamic calibration process 900a may include the analyte level calculation step 936. In some aspects, the step 936 may include calculating an analyte level using the current calibration function and the received sensor data. In some aspects, the calculated analyte level may be a calculation of the amount or concentration of the analyte in proximity to the analyte indicator 106. In some aspects, in step 936, the transceiver 101 may display the calculated analyte level. In some aspects, the transceiver 101 may display the calculated analyte level by conveying it to the display device 105 for display (e.g., using the display 620 of the user interface 640 of the display device 105).

In some aspects, the dynamic calibration process 900a may include the step 938. In some aspects, in the step 938, the transceiver 101 may determine whether to prompt the user to enter a reference analyte level measurement. In some aspects, the transceiver 101 may determine whether to prompt the user to enter a reference analyte level measurement based on (i) an amount of time that has passed since the transceiver 101 last performed a calibration (e.g., in step 946) and (ii) the current calibration frequency. In some aspects, the current calibration frequency may be the initial calibration frequency (e.g., the second calibration frequency) set in step 932, the first calibration frequency set in step 954, or the second calibration frequency set 958. For example, in some aspects, if the current calibration frequency is twice-daily, and 12 hours have passed since the transceiver 101 last performed a calibration, the transceiver 101 may determine to prompt the user to enter a reference analyte level measurement. For another example, in some aspects, if the current calibration frequency is daily, and 24 hours have passed since the transceiver 101 last performed a calibration, the transceiver 101 may determine to prompt the user to enter a reference analyte level measurement. In some aspects, if the transceiver 101 determines to prompt the user to enter a reference analyte level measurement, the dynamic calibration process 900a may proceed from step 938 to a prompting step 940. In some aspects, if the transceiver 101 determines not to prompt the user to enter a reference analyte level measurement, the dynamic calibration process 900a may proceed from step 938 to a step 942.

In some aspects, the dynamic calibration process 900a may include the prompting step 940. In some aspects, the prompting step 940 may include prompting a user for the one or more reference analyte level measurements. In some aspects, the step 940 may include the transceiver 101 causing the display device 105 to prompt a user for the one or more reference analyte level measurements (e.g., using one or more of the display 620, speaker 624, and vibration motor 626 of the user interface 640 of the display device 105).

In some aspects, the dynamic calibration process 900a may include the step 942. In some aspects, in the step 942, the transceiver 101 may determine whether the transceiver 101 has received a reference analyte level measurement. The reference analyte level measurement may be, for example and without limitation, an SMBG measurement obtained from, for example and without limitation, a finger-stick blood sample. In some aspects, the transceiver 101 may receive the reference analyte level measurement from the display device 105. In some non-limiting aspects, the transceiver 101 may receive the reference analyte level measurement in response to prompting the user for a reference analyte level measurement (e.g., in response to the transceiver 101 causing the display device 105 to prompt the user to enter a reference analyte level measurement) in step 940. In some aspects, a user may enter the reference analyte level measurement into the display device 105 (e.g., in response to being prompted to do so in step 940). In some aspects, a user may enter the reference analyte level measurement RM1 using the user input 622 of the user interface 640 of the display device 105. In some aspects, if the transceiver 101 has not received a reference analyte level measurement RM1, the dynamic calibration process 900a may proceed back to step 934 and continue using the current calibration function to calculate analyte levels when sensor data is received until a reference analyte level measurement is received. If the transceiver 101 has received a reference analyte level measurement, the dynamic calibration process 900a may proceed to a step 944.

In some aspects, the dynamic calibration process 900a may include the step 944. In some aspects, in step 944, the transceiver 101 may determine whether the received reference analyte level measurement is acceptable. In some aspects, the step 944 may include the transceiver 101 determining whether the received reference analyte level measurement meets one or more acceptance criteria.

In some aspects, the one or more acceptance criteria may include (i) the reference analyte level measurement being within an analyte level range (e.g., greater than 40 mg/dL and less than 400 mg/dL), (ii) analyte levels not changing faster than a threshold rate (e.g., 2.5 mg/dL/min), (iii) the current time being within a calibration window (e.g., one hour before to two hours after a scheduled calibration), (iv) the transceiver 101 being worn by the user for at least a first threshold period of time (e.g., five minutes) prior to calibration, (v) the reference analyte level measurement being taken less than a second threshold period of time (e.g., five minutes) prior to calibration, and/or (vi) a difference between the received reference analyte level measurement and the most recent analyte level calculated using sensor data being less than a threshold amount (e.g., 10 mg/dL or 30% of the calculated analyte level). In some aspects, the transceiver 101 may determine that the received reference analyte level measurement is not acceptable if any of the one or more acceptance criteria is not met. In some aspects, the transceiver 101 may determine that the received reference analyte level measurement is acceptable if each of the one or more acceptance criteria is met.

In some aspects, if the received reference analyte level measurement is determined to meet the acceptance criteria, the process 900a may proceed to a calibration step 946. In some aspects, if the received reference analyte level measurement is determined to not meet the acceptance criteria, the process 900a may proceed to the step 940 to prompt the user to enter another reference analyte level measurement (e.g., the transceiver 101 may cause the display device 105 to prompt the user to enter another reference analyte level measurement).

In some aspects, the dynamic calibration process 900a may include the calibration step 946. In some aspects, in step 946, the transceiver 101 may accept the reference analyte level measurement as a calibration point. In some aspects, accepting the reference analyte level measurement as a calibration point may include storing the reference analyte level measurement in a calibration point memory (e.g., a circular buffer). In some aspects, in step 946, the transceiver 101 may calibrate the analyte sensor using one or more reference analyte level measurements in the calibration point memory. In some aspects, calibrating the analyte sensor 101 may include calibrating the conversion function used to calculate analyte levels from sensor data. In some aspects, the transceiver 101 may calibrate the conversion function using one or more of the calibration points stored in the calibration point memory. In some aspects, the transceiver 101 may assign weights to the one or more calibration points. In some non-limiting aspects, the transceiver 101 may assign weights based on the age of the calibration points with less weight being given to older calibration points. In some aspects, the transceiver 101 may use the updated conversion function to calculate analyte levels from subsequently received sensor data.

In some aspects, the dynamic calibration process 900a may include a step 948 in which the transceiver 101 determines whether a time since implant of the analyte sensor 101 exceeds a time threshold (e.g., 21 days). In some aspects, if the time since implant of the analyte sensor 101 is determined to exceed the time threshold in step 948, the dynamic calibration process 900a may proceed to a step 950. In some aspects, if the time since implant of the analyte sensor 101 is not determined to exceed the time threshold in step 948, the dynamic calibration frequency may be maintained at the initial calibration frequency (e.g., the second calibration frequency) set in step 932, and the dynamic calibration process 900a may proceed to the step 934. In this way, in some aspects, the dynamic calibration phase 806 may be a steady state phase with the calibration frequency maintained at the initial calibration frequency until the time since implant exceeds the time threshold.

In some aspects, the dynamic calibration process 900a may include the step 950. In some aspects, in step 950, the transceiver 101 may calculate a degradation rate of the analyte indicator 106 of the analyte sensor 101. In some aspects, the transceiver 101 may use the received sensor data, the one or more calculated analyte levels (e.g., calculated in step 936), and/or the one or more received reference analyte level measurements to calculate the degradation rate of the analyte indicator 106 of the analyte sensor 101.

In some aspects, the transceiver 101 may calculate the degradation rate of the analyte indicator 106 of the analyte sensor 101 by calculating a rate of change of a sensitivity of the analyte indicator 106 (e.g., a sensitivity of the analyte indicator molecules 104). In some aspects, the transceiver 101 may calculate the degradation rate of the analyte indicator 106 of the analyte sensor 101 by calculating an absolute value of the rate of change of the sensitivity of the analyte indicator 106. In some aspects, the sensitivity of the analyte indicator 106 may indicate a sensitivity of the analyte indicator 106 (e.g., a sensitivity of the analyte indicator molecules 104) of the analyte sensor 100 to changes in an amount or concentration of an analyte in proximity to the analyte indicator 106.

In some aspects, the transceiver 101 may calculate the sensitivity of the analyte indicator 106 each time the transceiver 101 calibrates the analyte sensor 100 (e.g., calibrates the conversion function used to calculate analyte levels based on sensor data). In some aspects, the sensitivities calculated at each calibration may be used to calculate the rate of change of the sensitivities. In some aspects, the transceiver 101 may calculate the rate of change of the sensitivities of the analyte indicator 106 (and/or the absolute value of the rate of change) each time the transceiver 101 calibrates the analyte sensor 100. In some aspects, the transceiver 101 may calculate the rate of change of the sensitivity of the analyte indicator 106 as the difference between the current sensitivity and the sensitivity calculated at the previous calibration (e.g., Sensitivity$_i$–Sensitivity$_{i-1}$) divided by the difference between the current time and the time of the previous calibration (e.g., $t_i$–$t_{i-1}$). In some aspects, the absolute value of the rate of change of the responsivity (SensitivityROC$_{abs}$) may be calculated as SensitivityROC$_{abs}$=|(Sensitivity$_i$–Sensitivity$_{i-1}$)/($t_i$–$t_{i-1}$)|.

In some alternative aspects, more than two sensitivities (e.g., 3, 4, or 5 sensitivities) may be used to calculate the rate of change of the sensitivity (and/or the absolute value thereof). In some aspects, the transceiver 101 may calculate the rate of change of the sensitivity of the analyte indicator 106 by (i) constructing a sensitivity curve that fits two or more sensitivity data points (e.g., including at least the current sensitivity and the sensitivity calculated at the previous calibration) and (ii) calculating a derivative (e.g., a first derivative or a second derivative) of the sensitivity curve at the current time. In some aspects, the transceiver 101 may use curve fitting to construct the sensitivity curve (e.g., using linear or nonlinear regression). In some aspects, the sensitivity curve may exactly fit the two or more sensitivity data points, but this is not required, and, in some alternative aspects, the sensitivity curve may approximately fit the two or more sensitivity data points.

In some aspects, calculating the sensitivity of the analyte indicator 106 may include pairing reference analyte level measurements (e.g., accepted reference analyte level measurements) with the closest-in-time analyte levels calculated using the sensor data. In some aspects, the paired reference analyte level measurements may include the most-recently received and accepted reference analyte level measurement and one or more previously received and accepted reference analyte level measurements. In some aspects, the most-recently received and accepted reference analyte level measurement may be paired with the most-recent analyte level calculated using the most-recent received sensor data (or to the analyte level calculated closest-in-time to the time at which the reference analyte measurement was taken). In some aspects, the one or more previously received and accepted reference analyte level measurements may each be paired with the analyte level that was calculated closest-in-time to the time at which the reference analyte level measurement was taken. In some aspects, one or more of the analyte levels paired with the reference analyte level measurements may be interpolated analyte values. In some aspects, the interpolated analyte values may be calculated using analyte values calculated before and after the time at which the reference analyte level measurement was taken.

In some aspects, calculating the sensitivity may include calculating a ratio of a standard deviation of a sensor measurement of the received sensor data used to calculate the paired analyte levels to a standard deviation of what the sensor measurement would have been at initial testing for the reference analyte level measurements.

In some embodiment, the sensor measurement may be the digitized output (e.g., nanoamp values) of the signal photodetector 224, which is sensitive to emission light 331 from the analyte indicator molecules 104 of the analyte indicator 106. The digitized output of the signal photodetector 224 is referred to herein as SigOnOff_nA. In some aspects, calculating sensitivity may include temperature correcting SigOnOff_nA values to 37 C using a temperature correction term, and the temperature corrected sensor measurement may be referred to herein as SigOnOff_sensor_37C. In some aspects, the temperature correction term may be, for example and without limitation, 0.02. In some aspects, the temperature correction term may be within a range from 0-100%, and this range should be understood as describing and disclosing all temperature correction term values (including all decimal or fractional values) and sub-ranges within this range.

In some aspects, calculating sensitivity may include calculating what the sensor measurements (e.g., SigOnOff_nA) would have been at initial testing (e.g., manufacturing testing) for the reference analyte level measurements. In some aspects, what the sensor measurement would have been at initial testing for the reference analyte level measurements may be calculated using the inverse kd equation. In some aspects, the inverse kd equation is the G=kd*(s−smin)/(smax−s) equation flipped around to solve for s, where G is an analyte level. In some aspects, kd, smin, and smax may be determined through initial testing. In some aspects, what the sensor measurement would have been at initial testing for the reference analyte level measurements may be calculated by, for each reference analyte level measurement, substituting the reference analyte level measurements for G in the inverse kd equation and solving for s as the "supposed" SigOnOff_nA at initial testing. In some aspects, the "supposed" SigOnOff_nA at initial testing may be referred to herein as SigOnOff_QC.

In some aspects, the sensitivity may be defined as the ratio of the standard deviation of the temperature corrected sensor measurements (SigOnOff_sensor_37C) of the sensor data used to calculate the paired analyte levels and the standard deviation of what the sensor measurement would have been at initial testing (SigOnOff_QC) for the reference analyte level measurements:

sensitivity=std(SigOnOff_sensor_37C)/std (SigOnOff_QC).

In some alternative aspects (e.g., aspects in which the analyte indicator 106 includes analyte indicator molecules 104 and degradation indicator molecules 209), calculating the degradation rate of the analyte indicator 106 may include calculating a degradation of the analyte indicator molecules 104 each time the transceiver 101 calibrates the analyte sensor 100 (e.g., calibrates the conversion function used to calculate analyte levels based on sensor data). In some aspects, the degradation of the analyte indicator molecules 104 calculated at each calibration may be used to calculate the degradation rate. In some aspects, the transceiver 101 may calculate a rate of change of the degradation of the analyte indicator molecules 104 (and/or the absolute value of the rate of change) each time the transceiver 101 calibrates the analyte sensor 100. In some aspects, the transceiver 101 may calculate the rate of change of the degradation of the analyte indicator molecules 104 as the difference between the current degradation of the analyte indicator molecules 104 and the degradation of the analyte indicator molecules 104 calculated at the previous calibration (e.g., Degradation$_i$–Degredation$_{i-1}$) divided by the difference between the current time and the time of the previous calibration (e.g., $t_i$–$t_{i-1}$). In some aspects, the absolute value of the rate of change of the degradation of the analyte indicator molecules 104 (DegradationROC$_{abs}$) may be calculated as DegradationROC$_{abs}$=|(Degradation$_i$–Degradation$_{i-1}$)/($t_i$–$t_{i-1}$)|.

In some alternative aspects, more than two degradations (e.g., 3, 4, or 5 degradations) may be used to calculate the rate of change of the degradation of the analyte indicator molecules 104 (and/or the absolute value thereof). In some aspects, the transceiver 101 may calculate the rate of change of the degradation of the analyte indicator 106 by (i) constructing a degradation curve that fits two or more degradation data points (e.g., including at least the current degradation and the degradation calculated at the previous calibration) and (ii) calculating a derivative (e.g., a first derivative or a second derivative) of the degradation curve at the current time. In some aspects, the transceiver 101 may use curve fitting to construct the degradation curve (e.g., using linear or nonlinear regression). In some aspects, the degradation curve may exactly fit the two or more degradation data points, but this is not required, and, in some alternative aspects, the degradation curve may approximately fit the two or more degradation data points.

In some aspects, at each calibration, the transceiver 101 may calculate the degradation of the analyte indicator molecules 104 using one or more degradation measurements indicative of a degradation of the degradation indicator molecules 209 of the analyte indicator 106. In some aspects, the sensor data conveyed by the analyte sensor 100 and received by the transceiver 101 may include the one or more degradation measurements. In some aspects, the transceiver 101 may use the one or more degradation measurements of the most-recently received sensor data to calculate the degradation of the analyte indicator molecules 104. In some aspects, the degradation of the analyte indicator molecules 104 may be calculated using the one or more degradation measurements based on the correspondence of the degradation of the analyte indicator molecules 104 and the degradation of the degradation indicator molecules 209. In some aspects, the one or more degradation measurements may include a measurement indicative of an amount of second emission light 332 emitted by the degradation indicator molecules 209 (e.g., as measured by the one or more degradation photodetectors 228) and/or a measurement indicative of an amount of second excitation light 330 emitted to the degradation indicator molecules 209 and reflected by the degradation indicator molecules 209 (e.g., as measured by the one or more signal photodetectors 224 or one or more reference photodetectors).

In some aspects, the dynamic calibration process 900a may include a step 952 in which the transceiver 101 determines whether the calculated degradation rate of the analyte indicator 106 is below a first degradation rate threshold. In some aspects, the first degradation rate threshold may be, for example and without limitation, 0.40 percent degraded per day. In some aspects, if the transceiver 101 determines in step 952 that the calculated degradation rate is below the first degradation rate threshold, the dynamic calibration process 900a may proceed to a step 954. In some aspects, if the transceiver 101 determines in step 952 that the calculated degradation rate is not below the first degradation rate threshold, the dynamic calibration process 900a may proceed to a step 956.

In some aspects, the dynamic calibration process 900a may include the step 954. In some aspects, in step 954, the transceiver 101 may set the dynamic calibration frequency at a first calibration frequency if the calculated degradation rate is determined to be below the first degradation rate threshold. In some aspects, the step 954 may include providing an indication of the first calibration frequency to a user of the analyte sensor 100. In some aspects, the transceiver 101 may cause the display device 105 to provide the indication of the first calibration frequency (e.g., using the display 620 of the user interface 640 of the display device 105). In some aspects, the indication of the first calibration may, for example and without limitation, be as shown in FIG. 10A.

In some aspects, the dynamic calibration process 900a may include the step 956. In some aspects, in step 956, the transceiver 101 may determine whether the calculated degradation rate is below a second degradation rate threshold. In some aspects, the first degradation rate threshold may be, for example and without limitation, 1.00 percent degraded per day. In some aspects, the second degradation rate threshold may be greater than the first degradation rate threshold. In some aspects, if the transceiver 101 determines in step 956 that the calculated degradation rate is below the second degradation rate threshold, the dynamic calibration process 900a may proceed to a step 958. In some aspects, if the transceiver 101 determines in step 956 that the calculated degradation rate is not below the second degradation rate threshold, the dynamic calibration process 900a may proceed to a step 960.

In some aspects, the dynamic calibration process 900a may include the step 958. In some aspects, in step 958, the transceiver 101 may set the dynamic calibration frequency at a second calibration frequency. In some aspects, the second calibration frequency may be greater than the first calibration frequency. In some aspects, the step 958 may include providing an indication of the second calibration frequency to a user of the analyte sensor 100. In some aspects, the transceiver 101 may cause the display device 105 to provide the indication of the second calibration frequency (e.g., using the display 620 of the user interface 640 of the display device 105). In some aspects, the indication of the second calibration may, for example and without limitation, be as shown in FIG. 10B.

In some aspects, the dynamic calibration process 900a may include the step 960. In some aspects, in step 960, the transceiver 101 may set the dynamic calibration frequency at a third calibration frequency. In some aspects, the third calibration frequency may be the calibration frequency using during the initialization phase 804. In some aspects, the third calibration frequency may be greater than the second calibration frequency. In some aspects, the step 960 may include providing an indication of the third calibration frequency to a user of the analyte sensor 100. In some aspects, the transceiver 101 may cause the display device 105 to provide the indication of the third calibration frequency (e.g., using the display 620 of the user interface 640 of the display device 105). In some aspects, the dynamic calibration process 900a may proceed from step 960 to the initialization phase 804 (or to the dropout phase).

Figure 9B:
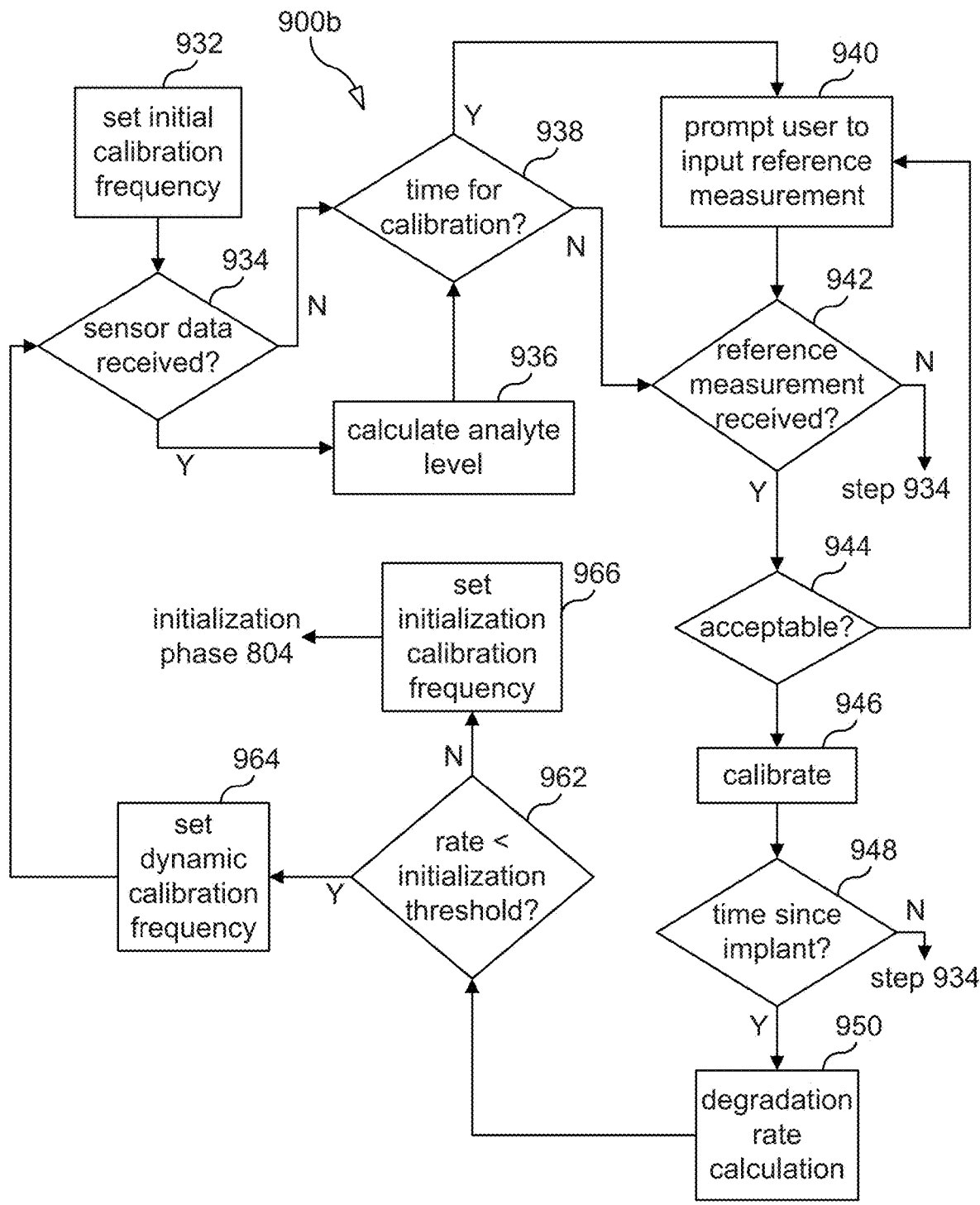

FIG. 9B is a flow chart illustrating an alternative dynamic calibration process 900b, which may be performed during the dynamic calibration phase 806 of the control process 800 illustrated in FIG. 8. In some aspects, the analyte monitoring system 50 may perform the dynamic calibration process 900b. In some aspects, the transceiver 101 (e.g., the PIC microcontroller 920 of the transceiver 101) may perform one or more steps of the dynamic calibration process 900a. In some aspects, the display device 105 (e.g., the computer 610 of the display device 105) may perform one or more steps of the dynamic calibration process 900b. Although the dynamic calibration process 900b is described below as being performed by the transceiver 101 alone, this is not required, and, in some alternative aspects, the display device 105 alone or in combination with the transceiver 101 may perform the dynamic calibration process 900b.

In some aspects, like the dynamic calibration process 900a described above with reference to FIG. 9A, the dynamic calibration process 900b may include one or more of steps 932, 934, 936, 938, 940, 942, 944, 946, 948, and 950. In some aspects, the dynamic calibration process 900b may include a step 962 in which the transceiver 101 determines whether the calculated degradation rate of the analyte indicator 106 is below an initialization degradation rate threshold. In some aspects, the process 900b may proceed to the step 962 from the degradation rate calculation step 950. In some aspects, the initialization degradation rate may be the same as the second degradation rate threshold of step 956 the dynamic calibration process 900a. In some aspects, if the transceiver 101 determines in step 962 that the calculated degradation rate is below the initialization degradation rate threshold, the dynamic calibration process 900a may proceed to a step 964. In some aspects, if the transceiver 101 determines in step 962 that the calculated degradation rate is not below the initialization degradation rate threshold, the dynamic calibration process 900b may proceed to a step 966.

In some aspects, the dynamic calibration process 900b may include the step 964. In some aspects, in step 964, the transceiver 101 may set a dynamic calibration frequency based on the calculated degradation rate. In some aspects, the transceiver 101 may use n degradation rate thresholds to set the dynamic calibration frequency at one of n+1 calibration frequencies. In some aspects, n may be any integer in the range greater than or equal to 1 and less than or equal to 100 (i.e., 1≤n≤100), and this range should be understood as describing and disclosing all integer values and sub-ranges within this range.

For example, in some aspects in which n=1, in step 964, the transceiver 101 may set a first calibration frequency (e.g., daily calibration) if the calculated degradation rate is determined to be below a degradation rate threshold, and the transceiver 101 may set a second calibration frequency (e.g., twice-daily calibration) if the calculated degradation rate is not determined to be below the degradation rate threshold. For another example, in some aspects in which n=2, in step 964, the transceiver 101 may set a first calibration frequency (e.g., monthly calibration) if the calculated degradation rate is determined to be below a first degradation rate threshold, the transceiver 101 may set a second calibration frequency (e.g., weekly calibration) if the calculated degradation rate is not determined to be below the first degradation rate threshold but is determined to be below a second degradation rate threshold, and the transceiver 101 may set a third calibration frequency (e.g., daily calibration) if the calculated degradation rate is not determined to be below the second degradation rate threshold. For still another example, in some aspects in which n=3, in step 964, the transceiver 101 may set a first calibration frequency (e.g., calibration every three days) if the calculated degradation rate is determined to be below a first degradation rate threshold, the transceiver 101 may set a second calibration frequency (e.g., calibration every other day) if the calculated degradation rate is not determined to be below the first degradation rate threshold but is determined to be below a second degradation rate threshold, the transceiver 101 may set a third calibration frequency (e.g., daily calibration) if the calculated degradation rate is not determined to be below the second degradation rate threshold but is determined to be below a third degradation rate threshold, and the transceiver 101 may set a fourth calibration frequency (e.g., twice-daily calibration) if the calculated degradation rate is not determined to be below the third degradation rate threshold.

In some alternative aspects, in step 964, the transceiver 101 may calculate a calibration frequency based on the calculated degradation rate, and set the dynamic calibration frequency at the calculated calibration frequency. In some aspects, the transceiver 101 may calculate the calibration frequency based on the current calculated degradation rate alone (e.g., $F=f(r_t)$, where F is the calibration frequency, $r_t$ is the degradation rate at the time t of the current calibration). In some aspects, the calibration frequency may be calculated, for example and without limitation, as Cals/week=max(degradation rate*100, 14), where the faster the rate the higher the calibration frequency and the maximum calibration frequency ends up being 2 per day. In some alternative aspects, the transceiver 101 may calculate the calibration frequency based on the current calculated degradation rate and one or more previously calculated degradation rates (e.g., one or more degradation rates calculated at one or more previous calibrations). That is, in some aspects, $F=f(r_t, r_{t-1}, r_{t-2}, \ldots)$, where F is the calibration frequency, $r_t$ is the degradation rate at the time t of the current calibration, $r_{t-1}$ is the degradation rate at the time t−1 of the previous calibration, and $r_{t-2}$ is the degradation rate at the time t−2 of the calibration before that. In some aspects, the calibration frequency may be calculated using the $2^{nd}$ derivative of the degradation and/or using a time-weighted average of the current and previous degradation rates. In some aspects using one or more previously calculated degradation rates, the transceiver 101 may weight the degradation rates based on their age (e.g., with older calculated degradation rates getting less weight). In some aspects, the calculated calibration frequency may be an estimate of when calibration will next be needed.

In some aspects, the step 964 may include providing an indication of the set calibration frequency to a user of the analyte sensor 100. In some aspects, the transceiver 101 may cause the display device 105 to provide the indication of the set calibration frequency (e.g., using the display 620 of the user interface 640 of the display device 105). In some aspects, the indication of the set calibration may, for example and without limitation, be as shown in FIG. 10A or 10B.

In some aspects, the dynamic calibration process 900b may include the step 966. In some aspects, in step 966, the transceiver 101 may set the dynamic calibration frequency at an initialization calibration frequency. In some aspects, the initialization calibration frequency may be the same as the third calibration frequency of step 960 of the dynamic calibration process 900a. In some aspects, the initialization calibration frequency may be the calibration frequency using during the initialization phase 804. In some aspects, the initialization calibration frequency may be greater than the range of dynamic calibration frequencies that can be set in step 964. In some aspects, the step 966 may include providing an indication of the initialization calibration frequency to a user of the analyte sensor 100. In some aspects, the transceiver 101 may cause the display device 105 to provide the indication of the initialization calibration frequency (e.g., using the display 620 of the user interface 640 of the display device 105). In some aspects, the dynamic calibration process 900b may proceed from step 966 to the initialization phase 804 (or to the dropout phase).

Aspects of the present invention have been fully described above with reference to the drawing figures. Although the invention has been described based upon these preferred aspects, it would be apparent to those of skill in the art that certain modifications, variations, and alternative constructions could be made to the described aspects within the spirit and scope of the invention. For example, in some aspects, the transceiver 101 may be a smartphone (e.g., an NFC-enabled smartphone). In some aspects, a smartphone (e.g., an NFC-enabled smartphone) may perform one or more functions of the transceiver 101 and the display device 105. In some aspects, the smartphone may take the place of both the transceiver 101 and the display device 105. That is, in some alternative aspects, a smartphone may be used to do one or more of: (i) communicate directly with the sensor 100, (ii) power the sensor 100, (iii) calculate analyte levels using sensor data received from the sensor 100, and (iv) execute the MMA, which displays the analyte levels and/or other analyte monitoring information (e.g., analyte level rate of change or trend information, alerts, alarms, notifications). In some of these alternative aspects, the smartphone may include the elements illustrated in FIGS. 6 and 7, and the smartphone may additionally include sensor interface elements that enable direct communication with the analyte sensor 100. In some aspects, the sensor interface may include, for example and without limitation, one or more of an inductor, an RFID reader IC, a power amplifier, and a voltage booster, such as those described with reference to FIG. 5 above.

For another example, in some aspects in which the display device 105 receives the sensor data conveyed by the analyte sensor 100, the display device 105 may receive the sensor data indirectly (e.g., via the transceiver 101) or directly. In some aspects in which the display device 105 receives one or more reference analyte level measurements, the display device 105 may receive the one or more reference analyte level measurements directly from the user (e.g., by entering the one or more reference analyte level measurements using the user input 622 of the user interface 640 of the display device 105).

For still another example, although the invention is described in the context of an analyte monitoring system, the invention is applicable to other types of systems. In addition, although the invention is described in the context of a mobile medical application executed on a display device, the invention is applicable to other types of applications (e.g., non-mobile applications and/or non-medical applications) executed on other types of devices.

What is claimed is:

1. A method comprising:
    receiving sensor data conveyed by an analyte sensor comprising an analyte indicator;
    using the sensor data to calculate one or more analyte levels;
    receiving one or more reference analyte level measurements;
    using the sensor data, the one or more calculated analyte levels, and/or the one or more reference analyte level measurements to calculate a degradation rate of the analyte indicator of the analyte sensor; and
    setting a dynamic calibration frequency based on the calculated degradation rate, wherein setting the dynamic calibration frequency based on the calculated degradation rate comprises:
        determining whether the calculated degradation rate is below a first degradation rate threshold; and
        setting the dynamic calibration frequency based on whether the calculated degradation rate is determined to be below the first degradation rate threshold.

2. The method of claim 1, wherein calculating the degradation rate comprises:
    calculating a first sensitivity of the analyte indicator of the analyte sensor to changes in an amount or concentration of an analyte in proximity to the analyte indicator at a first time;
    calculating a second sensitivity of the analyte indicator of the analyte sensor to changes in an amount or concentration of the analyte in proximity to the analyte indicator at a second time, wherein the second time is different than the first time;
    using the calculated first and second sensitivities to calculate a sensitivity rate of change; and
    calculating the degradation rate based on the sensitivity rate of change.

3. The method of claim 2, wherein using the calculated first and second sensitivities to calculate the sensitivity rate of change comprises dividing a difference between the calculated first and second sensitivities by a difference between the first and second times.

4. The method of claim 2, wherein using the calculated first and second sensitivities to calculate the sensitivity rate of change comprises constructing a sensitivity curve that fits sensitivity data points including at least the calculated first and second sensitivities at the first and second times, respectively.

5. The method of claim 2, wherein calculating the first and second sensitivities comprises pairing the one or more reference analyte level measurements with one or more analyte levels calculated using the sensor data.

6. The method of claim 2, wherein calculating the first and second sensitivities comprises calculating a ratio of a standard deviation of a sensor measurement of the received sensor data to a standard deviation of the sensor measurement at initial testing.

7. The method of claim 1, wherein the analyte indicator comprises analyte indicator molecules and degradation indicator molecules, and calculating the degradation rate comprises:
    calculating a first degradation of the analyte indicator molecules of the analyte indicator at a first time using one or more degradation measurements indicative of a degradation of the degradation indicator molecules of the analyte indicator at the first time;
    calculating a second degradation of the analyte indicator molecules at a second time using one or more degradation measurements indicative of a degradation of the degradation indicator molecules at the second time; and
    using the calculated first and second degradations of the analyte indicator to calculate the degradation rate.

8. The method of claim 7, wherein using the calculated first and second degradations to calculate the degradation rate comprises dividing a difference between the calculated first and second degradations by a difference between the first and second times.

9. The method of claim 7, wherein using the calculated first and second degradations to calculate the degradation rate comprises constructing a degradation curve that fits degradation data points including at least the calculated first and second degradations at the first and second times, respectively.

10. The method of claim 7, wherein the one or more degradation measurements indicative of the degradation of the degradation indicator molecules at the second time comprise a measurement indicative of an amount of emission light emitted by the degradation indicator molecules and/or a measurement indicative of an amount of excitation light emitted to the degradation indicator molecules and reflected by the degradation indicator molecules.

11. The method of claim 1, wherein setting the dynamic calibration frequency based on the calculated degradation rate comprises setting the dynamic calibration frequency at a first calibration frequency if the calculated degradation rate is determined to be below the first degradation rate threshold.

12. The method of claim 1, wherein setting the dynamic calibration frequency based on the calculated degradation rate further comprises:
  determining whether the calculated degradation rate is below a second degradation rate threshold; and
  setting the dynamic calibration frequency based on whether the calculated degradation rate is determined to be below the second degradation rate threshold.

13. The method of claim 12, wherein setting the dynamic calibration frequency based on the calculated degradation rate comprises setting dynamic calibration frequency at a second calibration frequency if the calculated degradation rate is determined to be below the second degradation rate threshold and not below the first degradation rate threshold.

14. The method of claim 13, wherein the second calibration frequency is higher than a first calibration frequency at which the dynamic calibration frequency is set if the calculated degradation rate is determined to be below the first degradation rate threshold.

15. The method of claim 12, wherein setting the dynamic calibration frequency based on the calculated degradation rate comprises setting the dynamic calibration frequency at a third calibration frequency if the calculated degradation rate is determined to be not below the second degradation rate threshold.

16. A method comprising:
  receiving sensor data conveyed by an analyte sensor comprising an analyte indicator;
  using the sensor data to calculate one or more analyte levels;
  receiving one or more reference analyte level measurements;
  using the sensor data, the one or more calculated analyte levels, and/or the one or more reference analyte level measurements to calculate a degradation rate of the analyte indicator of the analyte sensor; and
  setting a dynamic calibration frequency based on the calculated degradation rate, wherein setting the dynamic calibration frequency based on the calculated degradation rate comprises setting the dynamic calibration frequency at one of n+1 calibration frequencies based on whether the calculated degradation rate is below one or more of n degradation rate thresholds, and n is an integer greater than or equal to 1.

17. A method comprising:
  receiving sensor data conveyed by an analyte sensor comprising an analyte indicator;
  using the sensor data to calculate one or more analyte levels;
  receiving one or more reference analyte level measurements;
  using the sensor data, the one or more calculated analyte levels, and/or the one or more reference analyte level measurements to calculate a degradation rate of the analyte indicator of the analyte sensor; and
  setting a dynamic calibration frequency based on the calculated degradation rate, wherein setting the dynamic calibration frequency based on the calculated degradation rate comprises:
    determining whether the calculated degradation rate is below an initialization degradation rate threshold; and
    calculating a calibration frequency based on the calculated degradation rate if the calculated degradation rate is determined to be below the initialization degradation rate threshold.

18. A method comprising:
  receiving sensor data conveyed by an analyte sensor comprising an analyte indicator;
  using the sensor data to calculate one or more analyte levels;
  receiving one or more reference analyte level measurements;
  using the sensor data, the one or more calculated analyte levels, and/or the one or more reference analyte level measurements to calculate a degradation rate of the analyte indicator of the analyte sensor; and
  setting a dynamic calibration frequency based on the calculated degradation rate, wherein setting the dynamic calibration frequency based on the calculated degradation rate comprises calculating a calibration frequency based on the calculated degradation rate and one or more previously calculated degradation rates.

19. The method of claim 17, wherein setting the dynamic calibration frequency based on the calculated degradation rate comprises setting the dynamic calibration frequency at an initialization calibration frequency if the calculated degradation rate is determined to be not below the initialization degradation rate threshold.

20. A method comprising:
  receiving sensor data conveyed by an analyte sensor comprising an analyte indicator;
  using the sensor data to calculate one or more analyte levels;
  receiving one or more reference analyte level measurements;
  determining whether a time since implant of the analyte sensor exceeds a time threshold;
  using the sensor data, the one or more calculated analyte levels, and/or the one or more reference analyte level measurements to calculate a degradation rate of the analyte indicator of the analyte sensor; and
  setting a dynamic calibration frequency based on the calculated degradation rate, wherein the degradation rate is determined and the dynamic calibration frequency is set in response to the time since implant being determined to exceed the time threshold.

21. The method of claim 20, further comprising maintaining the dynamic calibration frequency if the time since implant is determined to not exceed the time threshold.

22. The method of claim 1, further comprising prompting a user of the analyte sensor to enter a reference analyte level measurement at the dynamic calibration frequency.

23. An apparatus comprising:
  a sensor interface device configured to receive sensor data conveyed by an analyte sensor comprising an analyte indicator;
  a display interface device configured to receive one or more reference analyte level measurements; and
  processing circuitry configured to:
    use the sensor data to calculate one or more analyte levels;
    use the sensor data, the one or more calculated analyte levels, and/or the one or more reference analyte level measurements to calculate a degradation rate of the analyte indicator of the analyte sensor; and
    set a dynamic calibration frequency based on the calculated degradation rate, wherein setting the dynamic calibration frequency based on the calculated degradation rate comprises:
      determining whether the calculated degradation rate is below a first degradation rate threshold; and setting the dynamic calibration frequency based on whether the calculated degradation rate is determined to be below the first degradation rate threshold.

24. An apparatus comprising:
a sensor interface device configured to receive sensor data conveyed by an analyte sensor comprising an analyte indicator;
a display interface device configured to receive one or more reference analyte level measurements; and
processing circuitry configured to:
    use the sensor data to calculate one or more analyte levels;
    use the sensor data, the one or more calculated analyte levels, and/or the one or more reference analyte level measurements to calculate a degradation rate of the analyte indicator of the analyte sensor; and
    set a dynamic calibration frequency based on the calculated degradation rate, wherein setting the dynamic calibration frequency based on the calculated degradation rate comprises setting the dynamic calibration frequency at one of n+1 calibration frequencies based on whether the calculated degradation rate is below one or more of n degradation rate thresholds, and n is an integer greater than or equal to 1.

25. An apparatus comprising:
a sensor interface device configured to receive sensor data conveyed by an analyte sensor comprising an analyte indicator;
a display interface device configured to receive one or more reference analyte level measurements; and
processing circuitry configured to:
    use the sensor data to calculate one or more analyte levels;
    use the sensor data, the one or more calculated analyte levels, and/or the one or more reference analyte level measurements to calculate a degradation rate of the analyte indicator of the analyte sensor; and
    set a dynamic calibration frequency based on the calculated degradation rate, wherein setting the dynamic calibration frequency based on the calculated degradation rate comprises:
    determining whether the calculated degradation rate is below an initialization degradation rate threshold; and
    calculating a calibration frequency based on the calculated degradation rate if the calculated degradation rate is determined to be below the initialization degradation rate threshold.

26. An apparatus comprising:
a sensor interface device configured to receive sensor data conveyed by an analyte sensor comprising an analyte indicator;
a display interface device configured to receive one or more reference analyte level measurements; and
processing circuitry configured to:
    use the sensor data to calculate one or more analyte levels;
    use the sensor data, the one or more calculated analyte levels, and/or the one or more reference analyte level measurements to calculate a degradation rate of the analyte indicator of the analyte sensor; and
    set a dynamic calibration frequency based on the calculated degradation rate, wherein setting the dynamic calibration frequency based on the calculated degradation rate comprises calculating a calibration frequency based on the calculated degradation rate and one or more previously calculated degradation rates.

27. An apparatus comprising:
a sensor interface device configured to receive sensor data conveyed by an analyte sensor comprising an analyte indicator;
a display interface device configured to receive one or more reference analyte level measurements; and
processing circuitry configured to:
    use the sensor data to calculate one or more analyte levels;
    determine whether a time since implant of the analyte sensor exceeds a time threshold;
    use the sensor data, the one or more calculated analyte levels, and/or the one or more reference analyte level measurements to calculate a degradation rate of the analyte indicator of the analyte sensor; and
    set a dynamic calibration frequency based on the calculated degradation rate, wherein the degradation rate is determined and the dynamic calibration frequency is set in response to the time since implant being determined to exceed the time threshold.

* * * * *